US011947739B2

(12) United States Patent
Sternberg et al.

(10) Patent No.: US 11,947,739 B2
(45) Date of Patent: Apr. 2, 2024

(54) METHODS, APPARATUS AND SYSTEMS USING MOTION OF VARIOUS INPUT DEVICES FOR CONTROLLING CONSUMER DEVICES

(71) Applicant: CEVA TECHNOLOGIES, INC., Mountain View, CA (US)

(72) Inventors: Seth Sternberg, Mountain View, CA (US); Steven Francz, Mountain View, CA (US); Stephen Scheirey, Mountain View, CA (US); Chad Lucien, Mountain View, CA (US); Friedrich Geck, Mountain View, CA (US); Peter Christopher Wood, Mountain View, CA (US); Bryan A. Cook, Silver Spring, MD (US); Mark Turner, Mountain View, CA (US)

(73) Assignee: CEVA TECHNOLOGIES, INC., Mountain View, CA (US)

( * ) Notice: Subject to any disclaimer, the term of this patent is extended or adjusted under 35 U.S.C. 154(b) by 0 days.

(21) Appl. No.: 17/618,991

(22) PCT Filed: Jun. 29, 2020

(86) PCT No.: PCT/US2020/040142
§ 371 (c)(1),
(2) Date: Dec. 14, 2021

(87) PCT Pub. No.: WO2020/264507
PCT Pub. Date: Dec. 30, 2020

(65) Prior Publication Data
US 2022/0308680 A1  Sep. 29, 2022

Related U.S. Application Data
(60) Provisional application No. 62/868,021, filed on Jun. 28, 2019.

(51) Int. Cl.
*G06F 3/0346* (2013.01)
*G06F 3/01* (2006.01)

(52) U.S. Cl.
CPC ............ *G06F 3/0346* (2013.01); *G06F 3/017* (2013.01)

(58) Field of Classification Search
CPC ............................. G06F 3/0346; G06F 3/017
See application file for complete search history.

(56) References Cited

U.S. PATENT DOCUMENTS 7,158,118 B2   1/2007   Liberty
8,072,424 B2  12/2011   Liberty
(Continued)

FOREIGN PATENT DOCUMENTS

AU         2019100079 B4    2/2019

OTHER PUBLICATIONS

International Search Report/Written Opinion dated Nov. 9, 2020 in related/corresponding PCT Application No. PCT/US2020/040142.
(Continued)

*Primary Examiner* — Grant Sitta
(74) *Attorney, Agent, or Firm* — PATENT PORTFOLIO BUILDERS PLLC

(57) ABSTRACT

Method, apparatus, and systems for roll angle estimation for an input/gesture device (IGD) are disclosed. The method includes estimating a first axis vector of the input/gesture device (IGD) relative to the surface of the mobile device (MD), as a first frame of reference, using readings from a first type of sensor; and estimating the first axis vector of the IDG relative to a different, second frame of reference using a gyroscope integration of readings from the 3-axis gyroscope. The method further includes aligning the first axis vector of the IDG in the first frame of reference with the first axis vector of the IDG in the second frame of reference;
(Continued)

minimizing a change in the alignment of the first axis vectors between the first frame of reference and the second frame of reference; and determining the roll angle of the IDG relative to the surface of the MD.

8 Claims, 10 Drawing Sheets

(56) References Cited

U.S. PATENT DOCUMENTS

| | | | |
|---|---|---|---|
| 8,740,820 B2* | 6/2014 | Weinberg | A61H 3/00 600/595 |
| 9,261,980 B2 | 2/2016 | Bassompiere et al. | |
| 2006/0279549 A1* | 12/2006 | Zhang | G06F 3/03545 345/173 |
| 2011/0163950 A1* | 7/2011 | Ye | G06F 3/0346 345/157 |
| 2013/0106740 A1* | 5/2013 | Yilmaz | G06F 3/04883 345/173 |
| 2014/0184509 A1 | 7/2014 | Mathews et al. | |
| 2016/0139690 A1* | 5/2016 | Chang | G06F 3/0338 345/179 |
| 2018/0364048 A1 | 12/2018 | Cook et al. | |

OTHER PUBLICATIONS

Wikipedia post entitled "Wahba's problem," 3 pages, last edited on Dec. 1, 2021, retrieved from Internet at https://en.wikipedia.org/wiki/Wahba%27s_problem.

Todd Davis, contributor at Essentialpicks, "Tilt sensitivity and rotation in Stylus: Do you really need it," 11 pages, [online] [retrieved on Dec. 8, 2021], retrieved from the Internet at https://essentialpicks.com/tilt-sensitivity-and-rotation-in-stylus.

* cited by examiner

METHODS, APPARATUS AND SYSTEMS USING MOTION OF VARIOUS INPUT DEVICES FOR CONTROLLING CONSUMER DEVICES

RELATED APPLICATION

This application is a National Stage of PCT/US2020/040142, filed on Jun. 29, 2020, which is related to, and claims priority from, U.S. Provisional Patent Application No. 62/868,021, entitled "Methods, Apparatus and Systems Using Motion of Various Input Devices for Controlling Consumer Devices", filed on Jun. 28, 2019, the disclosure of which is incorporated here by reference.

FIELD

Embodiments disclosed herein generally relate to wireless communications and, for example to methods, apparatus, and systems using motion of various input devices for controlling consumer devices.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to device and system designers, as well as service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple.

Of particular interest for this specification are the devices usable to interact with such frameworks, as well as other applications and systems. Various different types of devices can be used with such frameworks including, for example, phones, trackballs, "mouse"-type pointing devices, pens, styluses, etc. In some cases motion of the device can be translated into user interface commands, e.g., movement of a cursor on a display screen. An example of a pointing device which uses motion as an input can be found in U.S. Pat. No. 8,072,424.

However, the freedom of use associated with 3D pointers such as that described in the '424 patent creates additional challenges. For example, since there is generally no proxy surface on which a 3D pointing device rests, the orientation of the handheld control device may vary considerably from user to user or even use to use. If a 3D pointing device is used to, for example, control the movement of a cursor displayed on a screen, then some mapping is performed between the detected movement of the handheld device and the movement of the cursor on the screen.

One technique for performing this mapping is to use the body frame of the device as the frame of reference for mapping detected motion of the 3D pointing device into intended motion of the cursor. The term "body frame" refers to a set of axes associated with the body of the object being moved as described in more detail below. Using the body frame of reference to perform the mapping, however, has certain drawbacks. For example, it requires the user to hold the device in a certain orientation in order to obtain the cursor movement he or she desires. For example, if the user holds the device on its side and moves the device left to right, the cursor will move vertically, not horizontally, on the screen. The '424 patent addresses this issue by providing an orientation compensation technique to compensate for the orientation in which the device is held to provide a consistent user experience.

Other types of input devices which use motion as an input present other types of challenges which it would be desirable to address.

SUMMARY

According to an embodiment, system includes input/gesture device having: a sensor; a 3-axis gyroscope; a first 3-axis accelerometer; and a first processor; and a mobile device having: a second 3-axis accelerometer; and a second processor; wherein either said first processor or said second processor are configured to perform the following steps either independently or jointly: tracking, using reading from the first 3-axis gyroscope in the input/gesture device, an orientation of the input/gesture device relative to an arbitrary initial frame N; tracking, using reading from the second 3-axis gyroscope in the mobile device, an orientation of the input/gesture device relative to an arbitrary initial frame M; tracking of one of: yaw and pitch, using a third type of motion sensor, to solve for an alignment of the frame N to the frame M or (2) a linear acceleration frame alignment to solve for an alignment of a frame of input/gesture device to a frame of the mobile device; and determining the roll angle of the input/gesture device relative to the surface of the mobile device by solving for the frame alignment of frame N to frame M or the input/gesture device frame to the mobile device frame.

According to an embodiment, an input/gesture device includes a sensor; a 3-axis gyroscope; and a processor configured to: estimate a first axis vector of the input/gesture device relative to the surface of the mobile device, as a first frame of reference, using readings from the sensor; estimate the first axis vector of the input/gesture device relative to a different, second frame of reference using a gyroscope integration of readings from the 3-axis gyroscope; align the first axis vector of the input/gesture device in the first frame of reference with the first axis vector of the input/gesture device in the second frame of reference; minimize a change in the alignment of the first axis vectors between the first frame of reference and the second frame of reference; and determine the roll angle of the input/gesture device.

According to an embodiment, a method of roll angle estimation for an input/gesture device having a 3-axis gyroscope, as a first type of motion sensor, and a 3-axis accelerometer, as a second type of motion sensor, the input/gesture device being in communication with a mobile device having a surface, the method includes: measuring 3D linear motion or obtaining measurements of the 3D linear motion of the input/gesture device based on reading from the 3-axis accelerometer and the 3-axis gyroscope of the input/gesture device; measuring 2D planar linear motion or obtaining measurements of the 2D planar linear motion of the input/ gesture device based on reading from a third type of sensor; correlating the 3D linear motion with the 2D planar linear motion; and determining the roll angle of the input/gesture device relative to the surface of the mobile device by solving for frame alignment between an inertial frame and a mobile device frame.

According to an embodiment, an input/gesture device includes: a sensor; a 3-axis gyroscope; a 3-axis accelerometer; and a processor configured to: measure 3D linear motion or obtaining measurements of the 3D linear motion of the input/gesture device based on reading from the 3-axis accelerometer and the 3-axis gyroscope of the input/gesture device; measure 2D planar linear motion or obtaining measurements of the 2D planar linear motion of the input/ gesture device based on reading from a third type of sensor; correlate the 3D linear motion with the 2D planar linear motion; and determine the roll angle of the input/gesture device relative to the surface of the mobile device by solving for frame alignment between an inertial frame and a mobile device frame.

According to an embodiment, a method of roll angle estimation for an input/gesture device having a first 3-axis gyroscope, as a first type of motion sensor, and a 3-axis accelerometer, as a second type of motion sensor, the input/gesture device being in communication with a mobile device having a second 3-axis gyroscope and a surface, the method including: tracking, using reading from the first 3-axis gyroscope in the input/gesture device, an orientation of the input/gesture device relative to an arbitrary initial frame N; tracking, using reading from the second 3-axis gyroscope in the mobile device, an orientation of the input/ gesture device relative to an arbitrary initial frame M; tracking of one of: yaw and pitch, using a third type of motion sensor, to solve for an alignment of the frame N to the frame M or (2) a linear acceleration frame alignment to solve for an alignment of a frame of input/gesture device to a frame of the mobile device; and determining the roll angle of the input/gesture device relative to the surface of the mobile device by solving for the frame alignment of frame N to frame M or the input/gesture device frame to the mobile device frame.

According to an embodiment, a method of roll angle estimation for an input/gesture device having a 3-axis gyroscope, the input/gesture device being in communication with a mobile device having a surface, the method includes: estimating a first axis vector of the input/gesture device relative to the surface of the mobile device, as a first frame of reference, using readings from a first type of sensor; estimating the first axis vector of the input/gesture device relative to a different, second frame of reference using a gyroscope integration of readings from the 3-axis gyroscope; aligning the first axis vector of the input/gesture device in the first frame of reference with the first axis vector of the input/gesture device in the second frame of reference; minimizing a change in the alignment of the first axis vectors between the first frame of reference and the second frame of reference; and determining the roll angle of the input/gesture device relative to the surface of the mobile device.

According to an embodiment, a fidget gaming system includes one or more motion sensors adapted to monitor body movement of a user of the fidget gaming system, wherein the one or more motion sensors sense one or more of frequency, amplitude, and/or direction of movement of the user/gamer associated with one or more locations on the user; and a processor configured to receive data from the one or more motion sensors and to render graphic or audio feedback associated with the body movement data.

According to an embodiment, an input/gesture device includes one or more sensors disposed around a periphery of the input/gesture device, which one or more sensors are configured to sense a rotation of the periphery of the input/gesture device; and a processor configured to receive data from the one or more sensors and to send a display change command toward a display in response to said data.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

Various Embodiments may be implemented in V2X devices, drones, wearable devices, autonomous or semi-autonomous vehicles, robotic device/vehicles, cars, IoT gear, any device that moves, or a WTRU or other communication device, which, in turn, may be used in a communication network. The following section provides a description of some exemplary WTRUs and/or other communication devices and networks in which they may be incorporated.

Figure 1A:
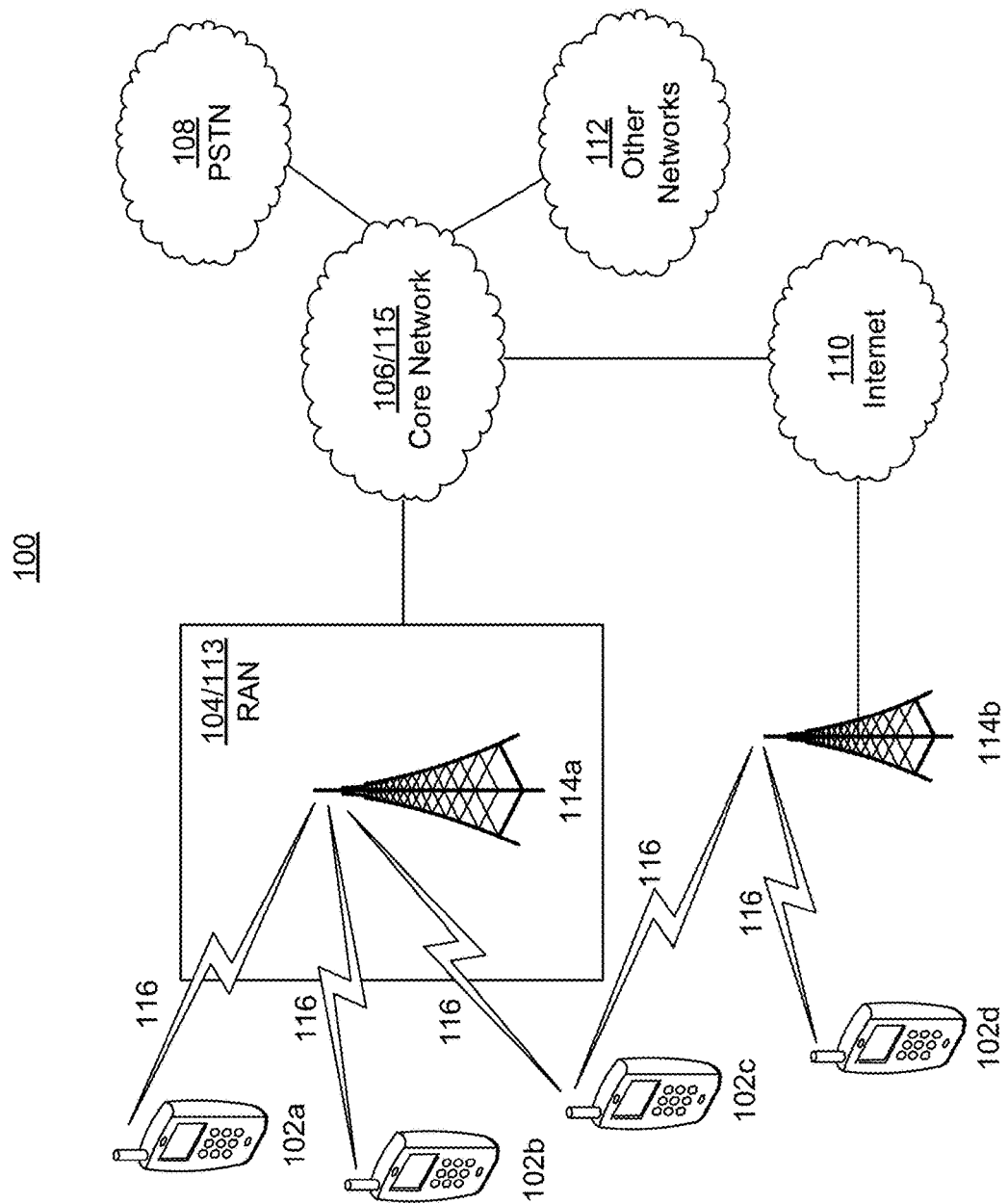
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial, a smart mobile device (such a smart pen, stylus, and/or pen cap) and/or industrial wireless networks, and the like. Any of the WTRUs 102a, 102b, 102c and 102d may be interchangeably referred to as a UE. The smart mobile device (e.g., something referred to as a pen, input and/or gesture device (pen/input/gesture device) may communicate with a consumer device such a display, a television, a set top box, a server device, an Internet of Things (IOT) device, a tablet device, a WIFI device and/or a laptop device using the cellular network or via direct communication such as Bluetooth, Bluetooth Low Energy (BLE), infrared and/or another short or long range communication technology.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB 160 and a gNB 180, among others).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNB, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
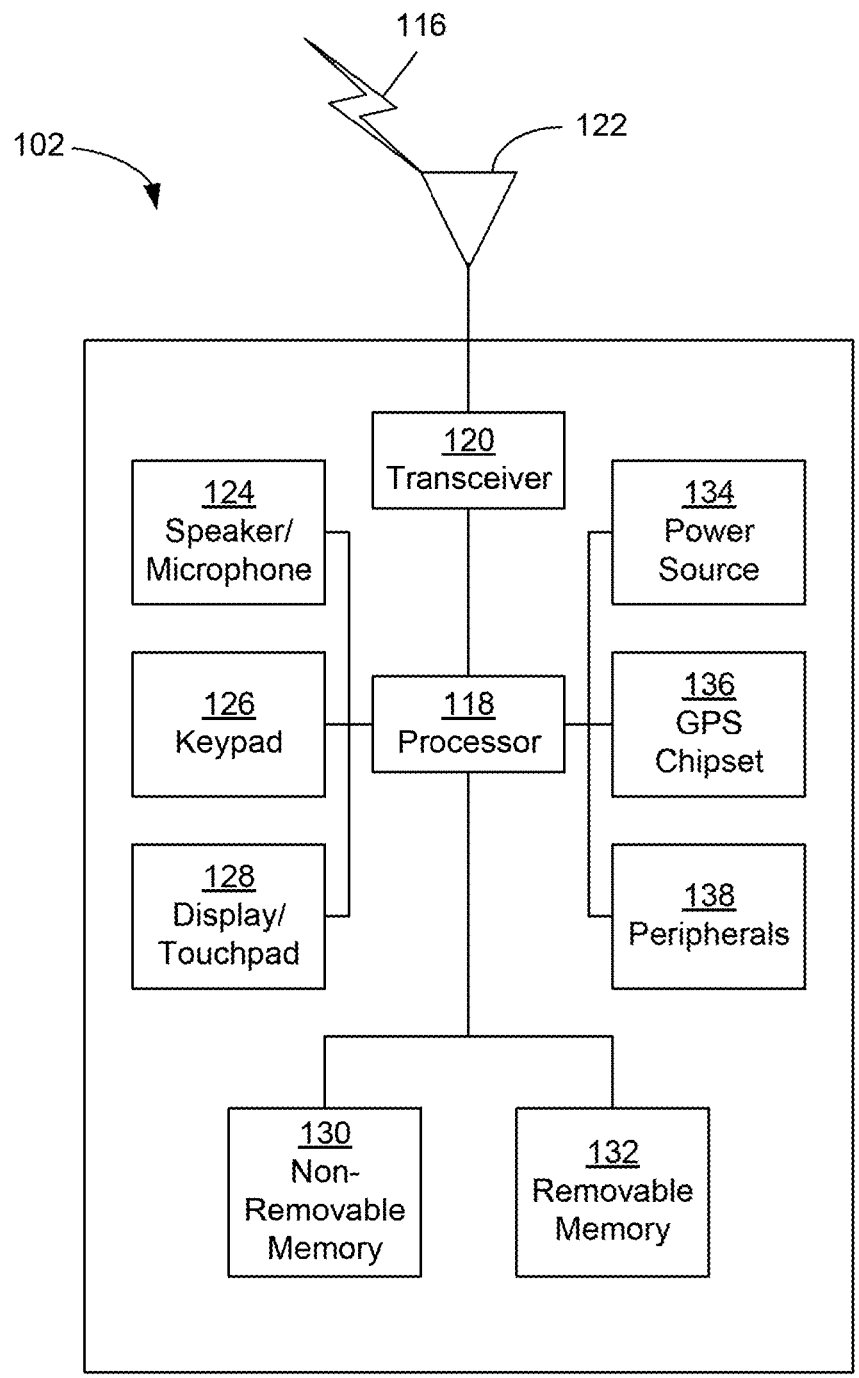
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display, and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
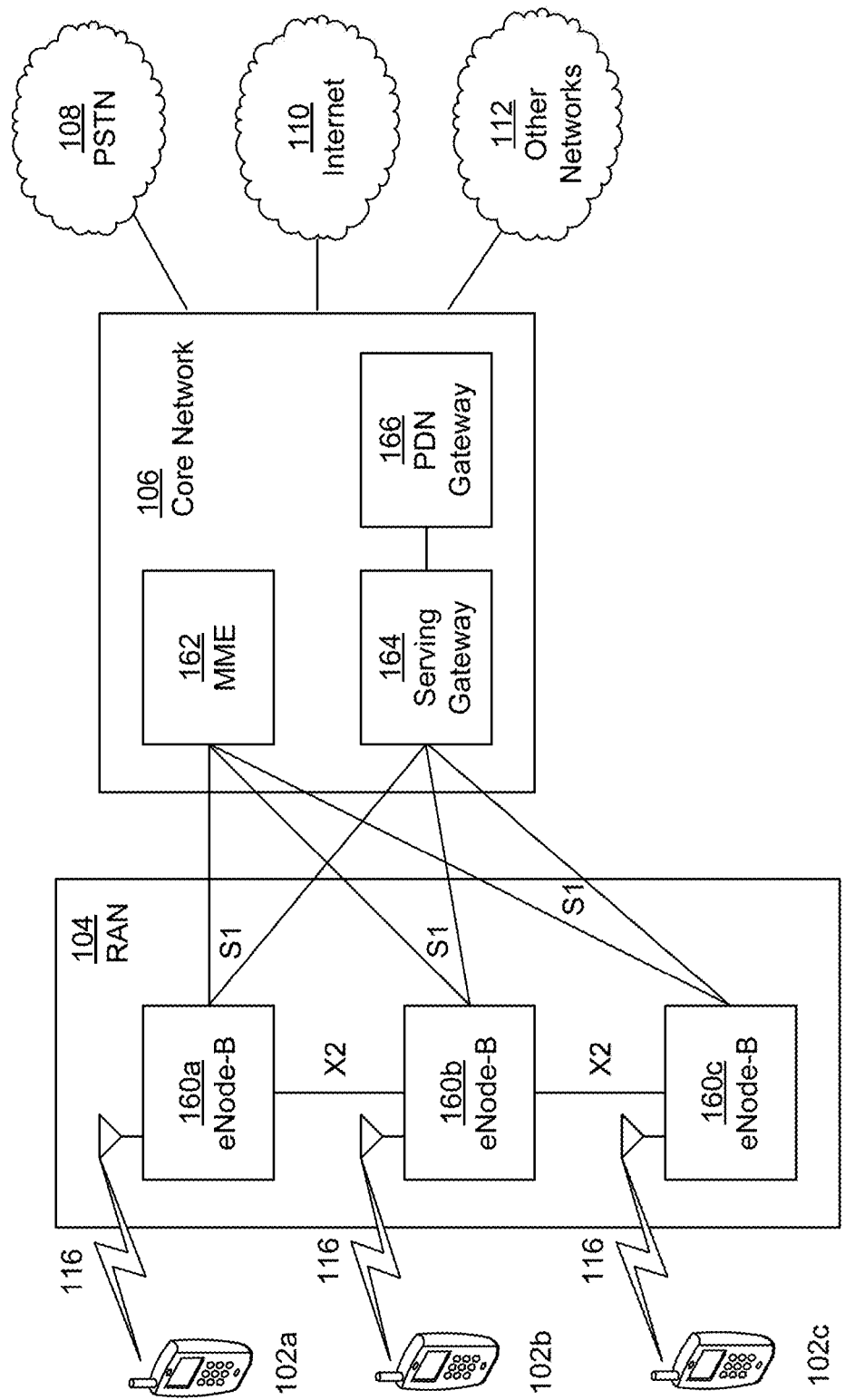
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNBs 160a, 160b, 160c, though it will be appreciated that the RAN 104 may include any number of eNBs while remaining consistent with an embodiment. The eNBs 160a, 160b, 160c may each include one or more transceivers for communicating with the WTRUs 102a, 102b, 102c over the air interface 116. In one embodiment, the eNBs 160a, 160b, 160c may implement MIMO technology. Thus, the eNB 160a, for example, may use multiple antennas to transmit wireless signals to, and/or receive wireless signals from, the WTRU 102a.

Each of the eNBs 160a, 160b, 160c may be associated with a particular cell (not shown) and may be configured to handle radio resource management decisions, handover decisions, scheduling of users in the UL and/or DL, and the like. As shown in FIG. 1C, the eNBs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNBs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNBs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNB handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
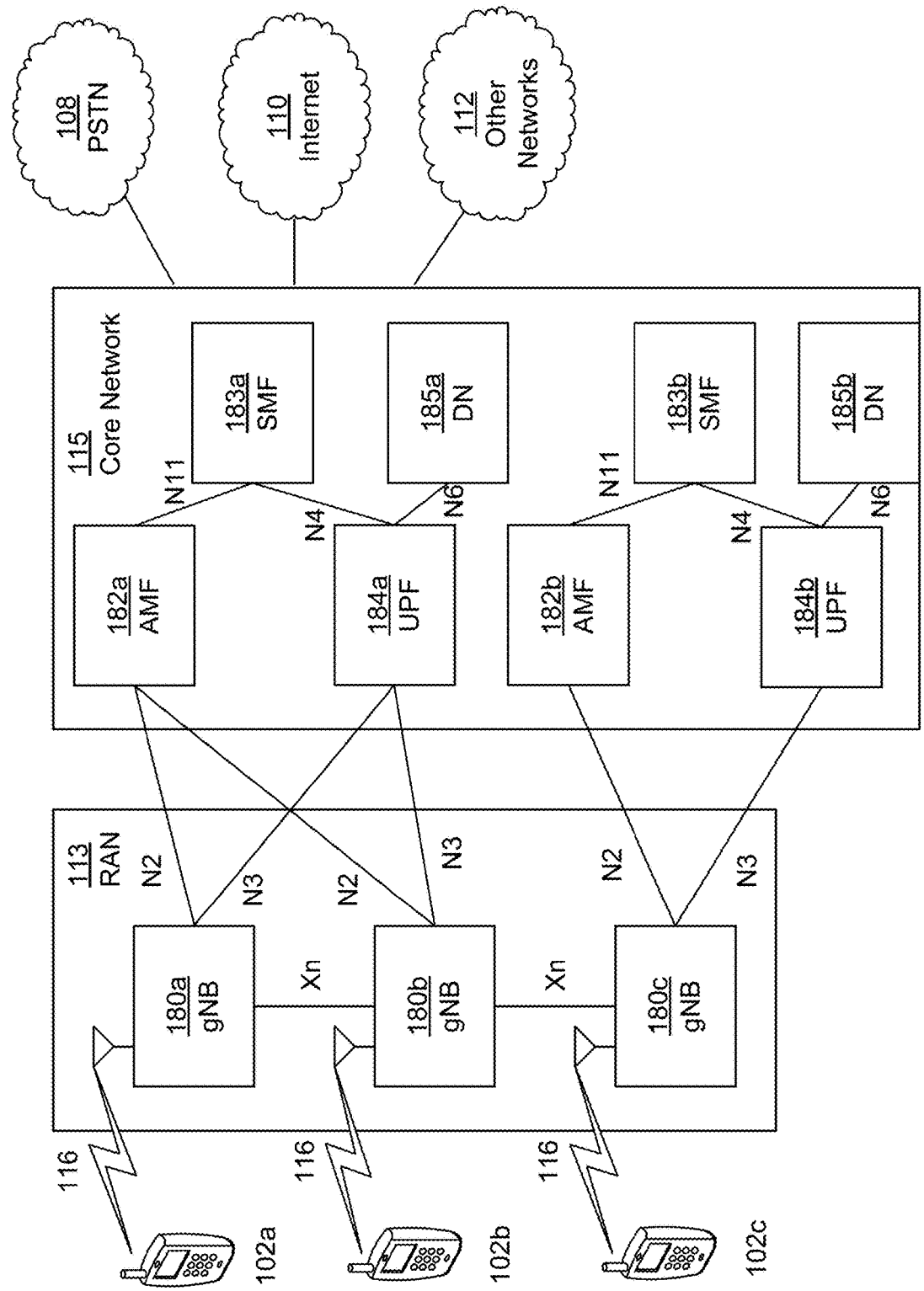
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from the gNB 180a and the gNB 180b (and/or the gNB 180c).

The WTRUs 102a, 102b, 102c may communicate with the gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with the gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with the gNBs 180a, 180b, 180c without also accessing other RANs (e.g., such as eNBs 160a, 160b, 160c). In the standalone configuration, WTRUs 102a, 102b, 102c may utilize one or more of the gNBs 180a, 180b, 180c as a mobility anchor point. In the standalone configuration, WTRUs 102a, 102b, 102c may communicate with the gNBs 180a, 180b, 180c using signals in an unlicensed band. In a non-standalone configuration, the WTRUs 102a, 102b, 102c may communicate with/connect to the gNBs 180a, 180b, 180c while also communicating with/connecting to another RAN such as the eNBs 160a, 160b, 160c. For example, the WTRUs 102a, 102b, 102c may implement DC principles to communicate with one or more gNBs 180a, 180b, 180c and one or more eNBs 160a, 160b, 160c substantially simultaneously. In the non-standalone configuration, eNBs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE (or WTRU) IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: the WTRU 102*a-d*, the Base Station 114*a-b*, the eNB 160*a-c*, the MME 162, the SGW 164, the PGW 166, the gNB 180*a-c*, the AMF 182*a-b*, the UPF 184*a-b*, the SMF 183*a-b*, the DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Representative Architecture for Input Control/Gesture Device

Figure 2:
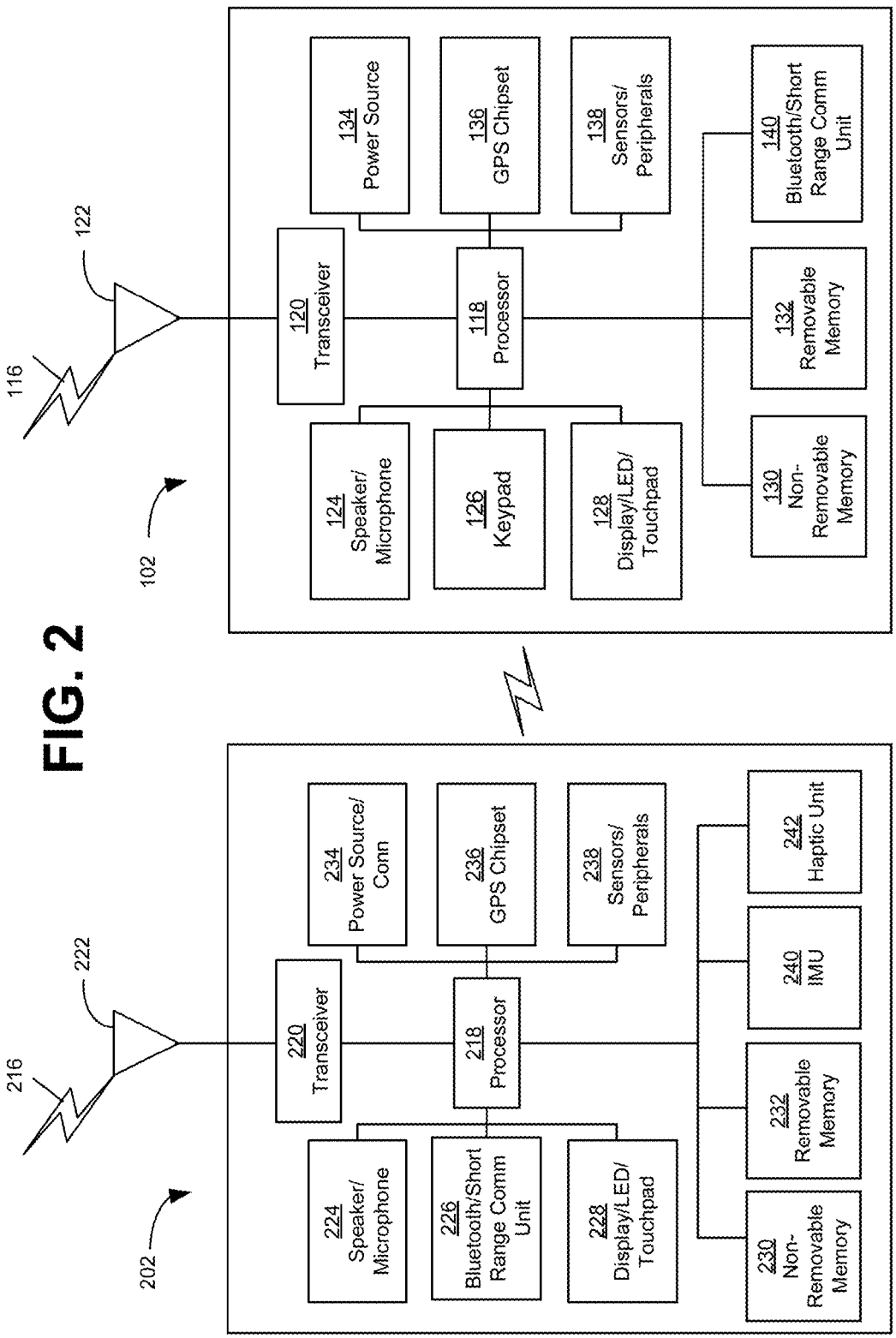
FIG. 2 is a diagram illustrating a representative input device in communications with a representative consumer device (e.g., a WTRU or another consumer device)

FIG. 2 is a system diagram illustrating a representative input/gesture device (sometime referred to as a pen/input/gesture device, a pen, a pen cap, a wand or a stylus) in communications with a representative consumer device (e.g., a WTRU 102 or other consumer device). The consumer device 102 may be any of: a tablet, an ipad, an IOT device, a laptop, a mobile device, a display device, a television, a touchscreen, a touch pad, and/or any other device that can communicate with the input/gesture device 202. As shown in FIG. 2, the input/gesture device 202 may include a processor 218, a transceiver 220, a transmit/receive element 222, a speaker/microphone 224, a short range communication unit 226, a display/LED/touchpad 228, non-removable memory 230, removable memory 232, a power source/power connection 234, a global positioning system (GPS) chipset 236, sensors/peripherals 238, an inertial measurement unit (IMU) 240, and/or a haptic unit 242, among others. It will be appreciated that the input/gesture device 202 may include any sub-combination of the foregoing elements while remaining consistent with an embodiment.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 218 may perform signal coding, data processing, power control, input/output processing, and/or any other functionality that enables the input/gesture device 202 to operate in a wireless environment. The processor 218 may be coupled to the transceiver 220, which may be coupled to the transmit/receive element 222. While FIG. 2 depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a consumer device 102 (either via the short range communication unit 226, via a base station (e.g., the base station 114*a*) over the air interface 116 and/or via direct device-to-device (D2D) communications. For example, in one embodiment, the transmit/receive element 222 may be an antenna configured to transmit and/or receive RF signals. In an embodiment, the transmit/receive element 222 may be an emitter/detector configured to transmit and/or receive IR, UV, or visible light signals, for example. In yet another embodiment, the transmit/receive element 222 may be configured to transmit and/or receive both RF and light signals. It will be appreciated that the transmit/receive element 222 may be configured to transmit and/or receive any combination of wireless signals.

Although the transmit/receive element 222 is depicted in FIG. 2 as a single element, the input/gesture device 202 may include any number of transmit/receive elements 222. More specifically, the input/gesture device 202 may employ MIMO technology. Thus, in one embodiment, the input/gesture device 202 may include two or more transmit/receive elements 222 (e.g., multiple antennas) for transmitting and receiving wireless signals over the air interface 116.

The transceiver 220 may be configured to modulate the signals that are to be transmitted by the transmit/receive element 222 and to demodulate the signals that are received by the transmit/receive element 222. As noted above, the input/gesture device 202 may have multi-mode capabilities. Thus, the transceiver 220 may include multiple transceivers for enabling the input/gesture device 202 to communicate via multiple RATs, such as LTE, NR, and IEEE 802.11, for example.

The processor 218 of the input/gesture device 202 may be coupled to, and may receive user input data from, the speaker/microphone 224, and/or the display/LED/touchpad 228 (e.g., a liquid crystal display (LCD) display unit or organic light-emitting diode (OLED) display unit). For example, the input/gesture device 202 may include a rotatable bezel (not shown), a push button switch and/or a toggle switch, among others to provide user input to the input/gesture device 202. The processor 218 may also output user data to the speaker/microphone 224, and/or the display/touchpad 128. In addition, the processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. In other embodiments, the processor 218 may access information from, and store data in, memory that is not physically located on the input/gesture device 202, such as on a server or a home computer (not shown). In certain embodiments, the processor 218 may control the haptic unit 242 to provide haptic feedback.

The processor 218 may receive power from the power source or via a power connection 234, and may be configured to distribute and/or control the power to the other components in the input/gesture device 202. The power source/connection 234 may be any suitable device for powering the input/gesture device 202 or connecting the input/gesture device 202 to a power source. For example, the power source 234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 218 may also be coupled to the GPS chipset 236, which may be configured to provide location information (e.g., longitude and latitude) regarding the current location of the input/gesture device 202. In addition to, or in lieu of, the information from the GPS chipset 236, the input/gesture device 202 may receive location information over an air interface and/or may determine its location based on the timing of the signals being received from two or more nearby base stations or other device in communications range. It will be appreciated that the input/gesture device 202 may acquire location information by way of any suitable location-determination method while remaining consistent with an embodiment.

The processor 218 may further be coupled to sensors and/or other peripherals 238, which may include one or more software and/or hardware modules that provide additional features, functionality and/or wired or wireless connectivity. For example, the other peripherals 238 may include an accelerometer, an e-compass, a satellite transceiver, a digital camera, a universal serial bus (USB) port, a vibration device, a television transceiver, a hands free headset, a further Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 238 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor. The input/gesture device 202 may include an inertial measurement unit (IMU) 240 to determine an orientation of the input/gesture device 202

The processor 218 of the input/gesture device 202 may operatively communicate with various peripherals 238 and the IMU 240 including, for example, any of: the one or more accelerometers, the one or more gyroscopes, the USB port, other communication interfaces/ports, the display, and/or other visual/audio indicators to implement representative embodiments disclosed herein.

In certain representative embodiments, the input/gesture device 202 may include a scroll wheel, rotational bezel, and/or a virtual scroll wheel (via a visual display) with haptic feedback to emulate wheel rotation. The scrolling mechanism may provide scrolling and/or mode selection, among others, which may be based on distance, speed and/or direction of the scrolling mechanism. In certain representative embodiments, the input/gesture device 202 may include a button and/or switch to enable gesture confirmation, gesture mode change, and other user input. For example, the rotational bezel may be a ring dial at the top of the input/gesture device (e.g., the pen), as an input control for the user interface.

In current drawing and painting applications, the save operation/feature is executed by tapping a user interface (UI) element or a series of UI elements when under a menu. This involves lifting the stylus from a drawing surface and shifting (mentally shifting) context from drawing to file functions and back to resume drawing.

Representative Tap Gesture (e.g., for Pen, Wand and/or Stylus) for Triggering Save (e.g., Application Save Command)

Figure 3:
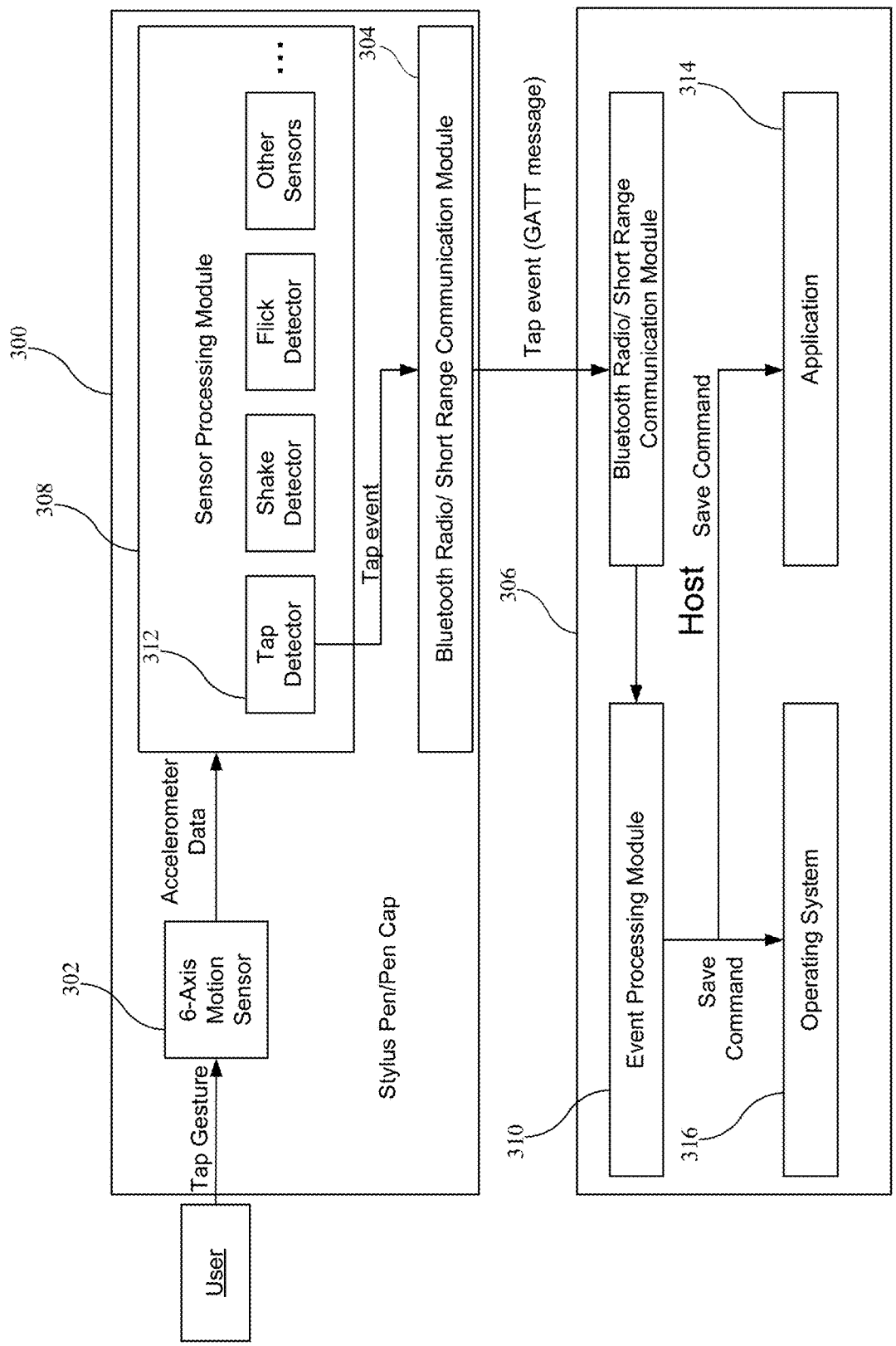
FIG. 3 is a diagram illustrating a representative procedure to execute a save command triggered by a Tap gesture.

FIG. 3 is a diagram illustrating a representative procedure to execute a save command triggered by a Tap gesture.

Referring to FIG. 3, a pen 300 (e.g., a stylus pen, wand and/or a pen cap adapted for a pen,) may contain or include a motion sensor (e.g., a 6-axis motion sensor 302) and a short range communication system 304 (e.g., a Bluetooth radio or a Bluetooth Low Energy (BLE radio). The pen or pen cap 300 may be connected via the Bluetooth link to a host device 306 (e.g., such as a WTRU, a UE, a mobile device, a table device, a laptop device, and/or a touchpad device, among others). A sensor processing module/software 308 may analyze sensor data (e.g., accelerometer data, and/or other sensor data, among others), for example from the motion sensor 302 (e.g., in a periodic manner, in an aperiodic manner and/or in an always-on manner). A gesture event processing module/software 310 may be implemented to process one or more gesture events and may output application and/or operating system commands. The modules/software 308 to process the sensor data and process the gesture events 310 may reside on, but is not limited to reside on, the pen 300, the host device 306, a combination of the pen 300 and host device 306 (in a distributed manner) or may reside in the cloud.

When or after a user performs a Tap gesture, the motion sensor 302 may detect the motion of the pen 300 and may output corresponding sensor data (e.g., accelerometer data) to the sensor processing module/software 308. The tap detector 312, a component of the sensor processing module/software 308, may recognize a tap signature within the accelerometer data and may cause the sensor processing module/software 308 to pass a Tap event (e.g., information or a signal indicating a tap event) to the host device 306. In certain representative embodiments, the signaling may be implemented via a Bluetooth GATT message. The gesture event processing module/software 310 may receive the Tap event signal/information/indication and may generate and/or send a Save command to a target application 314, to the entire host operating system 316 (as with a Ctrl-S keyboard command on Windows), or to whatever module/software is appropriate for the use case.

The stylus 300 (e.g., the pen and or the pen with the pen cap) may or may not be in contact with the host surface when the user performs the Tap gesture. In certain representative embodiments, the tap gesture may be a tap of the pen 300 against another object or may be a finger tap in which, for example, the finger of the user may tap the stylus. The process may be significantly faster than selecting a UI element and may not require the user to change and/or have the user change their hand location or pose, for example allowing the user to keep the stylus 300 (e.g., the pen) in the drawing area. The user does not have to change (e.g., mentally change) context from drawing or other primary use mode of the target application.

In current drawing and painting applications, the save feature is executed by tapping a UI element (or series of UI elements when under a menu). This involves lifting the stylus from the drawing surface and shifting (mentally shifting) a context from drawing to file functions and back to resume drawing.

Representative Flick Gesture (e.g., for Pen, Wand and/or Stylus) for Triggering Save (e.g., Application Save Command)

Figure 4:
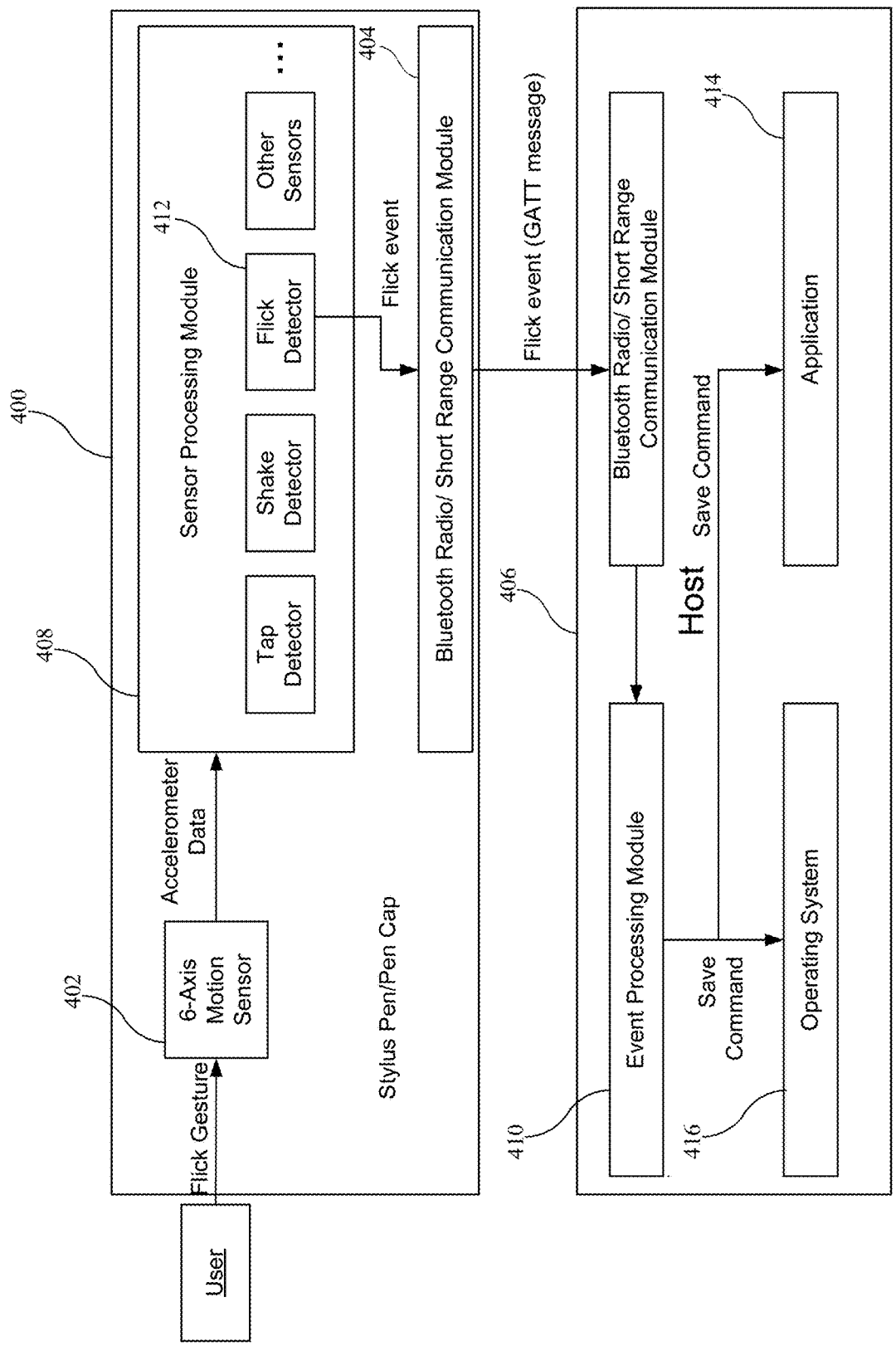
FIG. 4 is a diagram illustrating a representative procedure to execute a save command triggered by a Flick gesture.

FIG. 4 is a diagram illustrating a representative procedure to execute a save command triggered by a Flick gesture (for example a user of a stylus pen may perform a Flick gesture to trigger an application save).

Referring to FIG. 4, an input/gesture device 400 (for example a stylus, a pen, a pen cap of a pen and/or a wand among others) may contain or include a motion sensor 402 (e.g., an n-axis motion sensor such as a 6-axis motion sensor) and a communication unit 404 (for example a Bluetooth radio, a BLE radio, a short range communications module and/or infrared communications module, among others). The input/gesture device 400 (e.g., the pen) may be connected via a link (e.g., the Bluetooth link) to a host device 406. A sensor processing module/software 408 may analyze sensor data (e.g., accelerometer or other sensor data) from the motion sensor 402 periodically or in an always-on manner. A gesture event processing module/software 410 may be implemented, for example to process one or more gesture events and to output application and/or operating system commands (and/or data). The gesture event processing module/software 410 may reside on, but may not limited to, the pen 400, the host device 406, and/or may be distributed on the pen 400 and host device 406 or may reside in the cloud.

When or after a user performs a Flick gesture, the motion sensor 402 may detect the motion of the pen 400 and may output corresponding data (e.g., accelerometer data) to the sensor processing module/software 408. The flick detector 412, a component of the sensor processing module/software 408, may recognize a flick signature within the accelerometer data and may cause the sensor processing module/software 408 to pass a Flick event to the host device 406. In certain representative embodiments, the Flick event may be indicated by information in a Bluetooth GATT message. A gesture event processing module/software 410 may then receive the Flick event and/or determine that the Flick event occurred based on the GATT message. The gesture event processing module/software 410 may send a Save command to a target application 414, to the entire host operating system 416 (as with a Ctrl-S keyboard command on Windows), and/or to whatever module/software is appropriate for the use case.

The input/gesture device 400 (e.g., stylus) may or may not be in contact with the host surface when the user performs the Flick gesture. The process may be faster (e.g., significantly faster) than selecting a user interface (UI) element and may not have and/or require the user to change their hand location and/or pose and may keep the input/gesture device in the drawing area. The user does not have to mentally change a context from a drawing mode or another primary use mode of the target application.

It is common for users to share files with others over several media, including but not limited to email, MMS, and/or postings to social media. In current drawing and painting applications, the share feature is executed by tapping a UI element (or series of UI elements when under a menu) and involves lifting a stylus from the drawing surface and shifting (mentally shifting) a context from drawing to file functions and back to resume drawing.

Figure 5:
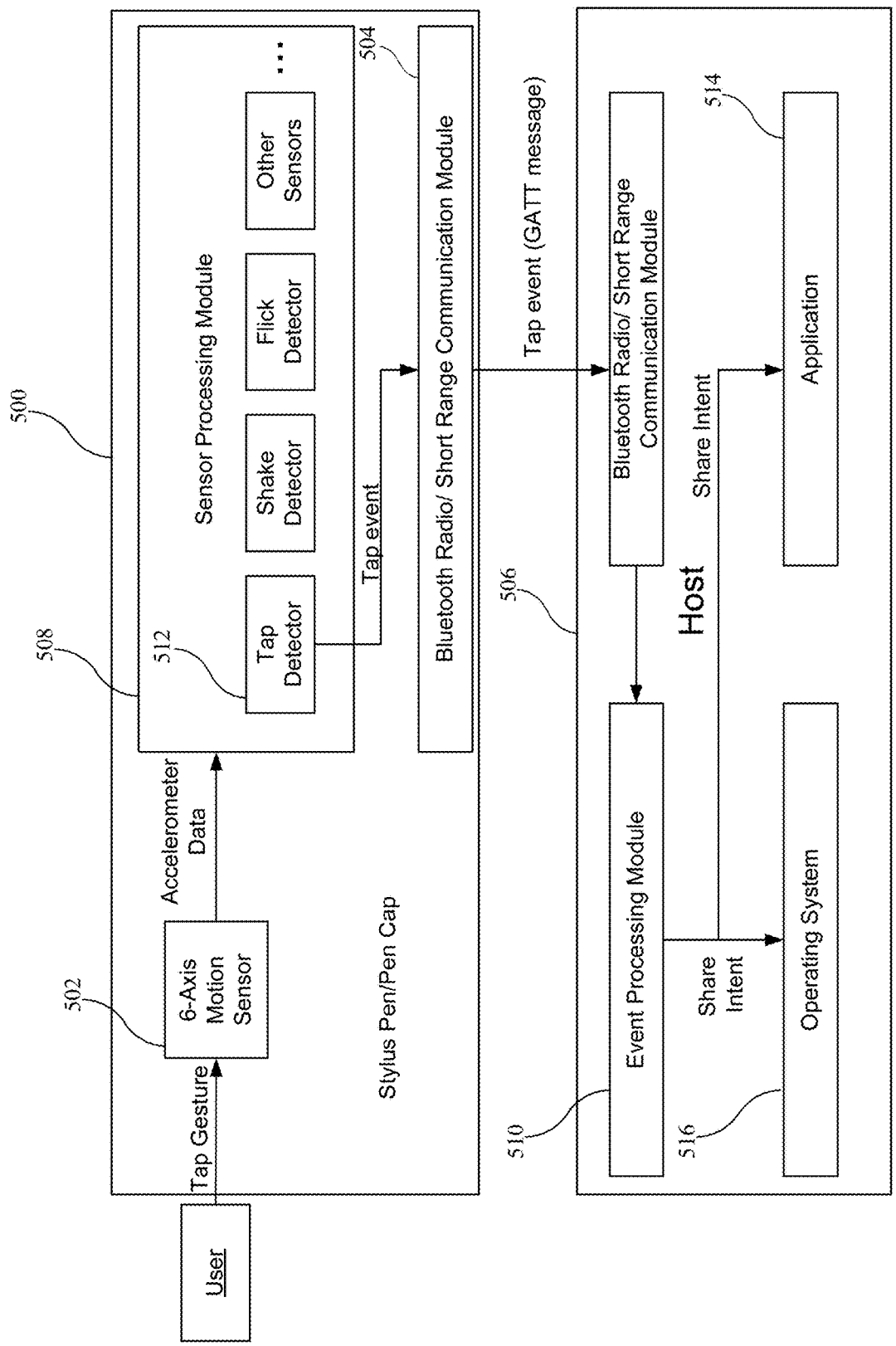
FIG. 5 is a diagram illustrating a representative procedure to execute a share (e.g., send and/or exchange application information (a file, contact information, or other information, as appropriate) triggered by a Tap gesture.

Representative Tap Gesture (e.g., for Pen, Wand and/or Stylus) for Triggering Sharing (e.g., Sharing Intent) for Example Via an Information Sharing Operation FIG. 5 is a diagram illustrating a representative procedure to execute a sharing operation triggered by a Tap gesture (for example a user of a stylus pen may perform a Tap gesture to trigger file sharing or other sharing operation).

Referring to FIG. 5, an input/gesture device 500 (for example a stylus, a pen, a pen cap of a pen and/or a wand among others) may contain or include a motion sensor 502 (e.g., an n-axis motion sensor such as a 6-axis motion sensor) and a communication unit 504 (for example a Bluetooth radio, a BLE radio, a short range communications module and/or infrared communications module, among others). The input/gesture device 500 (e.g., the pen) may be connected via a link (e.g., the Bluetooth link) to a host device 506. A sensor processing module/software 508 may analyze sensor data (e.g., accelerometer or other sensor data) from the motion sensor 502 periodically or in an always-on manner. A gesture event processing module/software 510 may be implemented, for example to process one or more gesture events and to output application and/or operating system commands (and/or data). The gesture event processing module/software 510 may reside on, but may not limited to, the pen 500, the host device 506, and/or may be distributed on the pen 500 and host device 506 or may reside in the cloud.

When or after a user performs a Tap gesture, the motion sensor 502 may detect the motion of the pen 500 and may output corresponding sensor data (e.g., accelerometer data) to the sensor processing module/software 508. The tap detector 512, a component of the sensor processing module/software 508, may recognize a tap signature within the accelerometer data and may cause the sensor processing module/software 508 to pass a Tap event (e.g., information or a signal indicating a tap event) to the host device 506. In certain representative embodiments, the signaling may be implemented via a Bluetooth GATT message. The gesture event processing module/software 508 may receive the Tap event signal/information/indication and may generate and/or may send a Share intent to a target application 514, to the entire host operating system 516, or to whatever module/software is appropriate for the use case. On Android, for example, this may cause the sharing menu to appear, where the user may select which app to share with. This system may be extended by having different Tap gestures shortcut to different shares. For example, a tap at the tip of the pen 500 may automatically share with email, while a tap at the base of the pen may automatically share with Facebook.

The input/gesture device 500 (e.g., a stylus, a pen, and/or the pen with a pen cap) may or may not be in contact with the host surface when the user performs the Tap gesture. the Tap gesture may be a tap of the pen 500 against another object or may be a finger tap in which, for example, the finger of the user may tap the stylus. The process may be faster (e.g., significantly faster) than selecting a user interface (UI) element and may not have and/or require the user to change their hand location and/or pose and may keep the input/gesture device in the drawing area. The user does not have to change (e.g., mentally change) context from drawing or other primary use mode of the target application.

Figure 6:
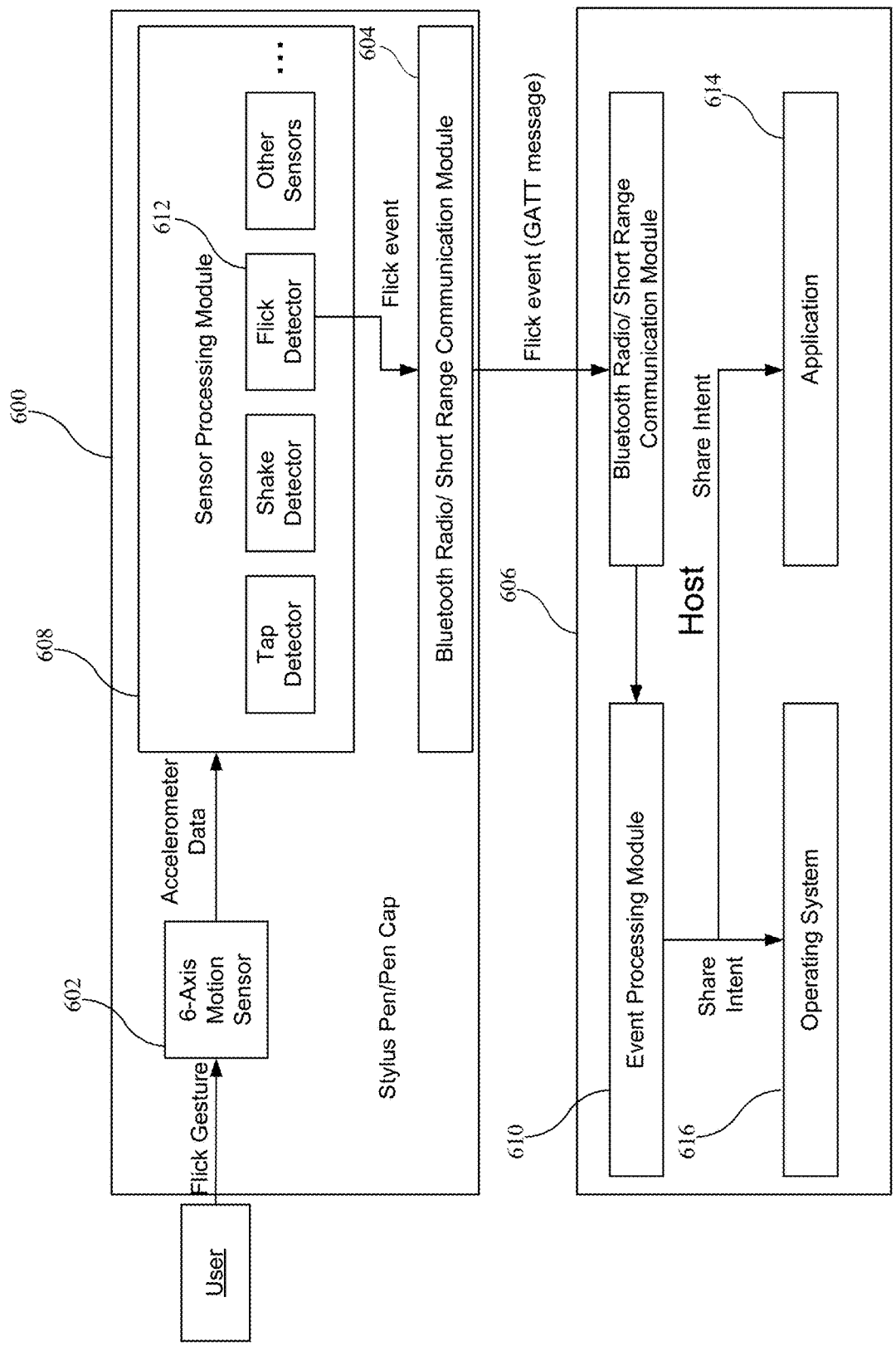
FIG. 6 is a diagram illustrating a representative procedure to execute a share (e.g., send and/or exchange application information (a file, contact information, or other information, as appropriate) triggered by a Flick gesture.

Representative Flick Gesture (e.g., for Pen, Wand and/or Stylus) for Triggering Sharing (e.g., Sharing Intent) for Example Via an Information Sharing Operation FIG. 6 is a diagram illustrating a representative procedure to execute a sharing operation triggered by a Flick gesture (for example a user of a stylus pen may perform a Flick gesture to trigger file sharing or other sharing operation).

Referring to FIG. 6, an input/gesture device 600 (for example a stylus, a pen, a pen cap of a pen and/or a wand among others) may contain or include a motion sensor 602 (e.g., an n-axis motion sensor such as a 6-axis motion sensor) and a communication unit 604 (for example a Bluetooth radio, a BLE radio, a short range communications module and/or infrared communications module, among others). The input/gesture device 600 (e.g., the pen) may be connected via a link (e.g., the Bluetooth link) to a host device 606. A sensor processing module/software 608 may analyze sensor data (e.g., accelerometer or other sensor data) from the motion sensor 602 periodically or in an always-on manner. A gesture event processing module/software 610 may be implemented, for example to process one or more gesture events and to output application and/or operating system commands (and/or data). The gesture event module/software 610 may reside on, but may not limited to, the pen 600, the host device 606, and/or may be distributed on the pen 600 and host device 606 or may reside in the cloud.

When or after a user performs a Flick gesture, the motion sensor 602 may detect the motion of the pen 600 and may output corresponding sensor data (e.g., accelerometer data) to the sensor processing module/software 608. The Flick detector 612, a component of the sensor processing module/software 608, may recognize a Flick signature within the accelerometer data and may cause the sensor processing module/software 608 to pass a Flick event (e.g., information or a signal indicating a flick event) to the host device 606. In certain representative embodiments, the signaling may be implemented via a Bluetooth GATT message. The gesture event processing module/software 610 may receive the Flick event signal/information/indication and may generate and/or may send a Share intent to a target application 614, to the entire host operating system 616, or to whatever module/software is appropriate for the use case. On Android, for example, this may cause the sharing menu to appear, where the user may select which app to share with. This system may be extended by having different Flick gestures shortcut to different shares. For example, a Flick at the tip or in a particular direction of the pen 600 may automatically share with email, while a Flick at the base or in another direction of the pen 600 may automatically share with Facebook.

The input/gesture device 600 (e.g., stylus, pen, and/or the pen with a pen cap) may or may not be in contact with the host surface when the user performs the Flick gesture. The process may be faster (e.g., significantly faster) than selecting a user interface (UI) element and may not have and/or require the user to change their hand location and/or pose and may keep the input/gesture device in the drawing area. The user does not have to change (e.g., mentally change) context from drawing or other primary use mode of the target application.

A stylus pen is often used for text entry, either through handwriting recognition or as a pointer to control a virtual keyboard.

Although a Tap-to-Save gesture, a Flick-to-Save gesture, a Tap-to-Share, and a Flick-to-share are shown, any function (e.g., Save, Open, Close, Print, Wider Line Width, Narrower Line Width, or other application specific function/command such as send an email) may be associated to a gesture of the input/gesture device.

Although a Tap gesture, and a Flick gesture are shown, other gestures are possible including shake gestures.

Although a Tap gesture, and a Flick gesture are shown, these gestures may have multiple components. For example, the input/gesture device may be associated to a first command/function/operation (e.g., a save command) if the device is in contact with a surface and a second command/function/operation if the device is not in contact with a surface (e.g., is in the air).

Although a Tap gesture is shown, the input/gesture device may recognize any number of different taps or double taps as different gesture for association with respectively different commands/functions/operations. For example, a finger tap, a tap on a first end of the input/gesture device, a tap on a second end of the input/gesture device, and a double tap may be assigned as different gestures to respectively different operations.

Although a Flick gesture is shown, the input/gesture device may recognize any number of different flicks or double flicks as different gesture for association with respectively different commands/functions/operations. For example, a flick in a particular direction, a flick on a first end of the input/gesture device, a flick on a second end of the input/gesture device, and a double flick may be assigned as different gestures to respectively different operations.

Representative Fidget Gaming Implementations

Various sensors have been used to sense a player's movement for control of games (e.g., electronic games). Generally, such games are based on direct finger control input to a user interface or sensing large body movements. In certain representative embodiments, games may be implemented that may be played by monitoring fidgeting of a user/gamer. For example, body movements (e.g., both large and small body movement) may be sensed by a fidget device such as a smart pen, or another movement sensing device (e.g., small body movement device). The fidget device may be carried by a user or may interface to and/or communication with (e.g., via Bluetooth, Bluetooth Low Energy (BLE), infrared, and/or cellular communications) a set of sensors (e.g., associated with a body area network (BAN)) to sense frequency, amplitude, and/or direction of movement of the user/gamer associated with one or more locations on the user/gamer, as inputs.

In certain representative embodiments, the output of the fidget device may interface to and/or communicate with (e.g., via Bluetooth, BLE, infrared, and/or cellular communications) a smartphone, a tablet, a smartwatch, a remote display device (e.g., a smart television, a smart picture or other IOT device having a display). In certain representative embodiments, the fidget device may be integrated with or into a smartphone, a smartwatch, and/or a display device.

A fidget game may include real-time or near real-time graphic feedback to the gamer/user of one or a composite of the characteristics of the fidget movement displayed from a phone, tablet, or other remote display device. In certain representative embodiments, the graphic feedback may be recorded as an image for review and/or as new abstract artwork.

The user/gamer may select one or a composite of the characteristics of the fidget movements to be displayed and/or used by the fidget game. For example, the user/gamer may select a fidget amplitude, a fidget direction, a fidget frequency, or a combination of these parameters, as fidget filters. The game, for example, may count the number of times certain events associated with the selected fidget filters occur. The game may be a competition among users/gamers to achieve a goal, such as the highest or the lowest number of counted fidget events or may be an individual goal for the user/gamer to achieve (such as less than or more than a set number of such fidget events in a period of time).

In certain representative embodiments, the graphic feedback may be linked to and or may be blended with music such that fidget movement may enable variations in/deviation from an original music composition based on fidget movements (e.g., sensor outputs, for example filtered for one or more fidget movements/fidget characteristics).

In certain representative embodiments, artists/users (e.g., music artists) may generate and/or create their own artwork from the feedback associated with the fidget movement (e.g., fidget gestures). Music artist may also create music composition variations based on the gestures (e.g., fidget gestures). For example, the original music composition may be blended/mixed to include variations in accordance with the fidget gestures. This artwork and/or music derived using the fidget gestures may be sold as custom art/custom music (for example in or at concerts, via albums/album covers and/or in stores and/or via other suppliers). The blended or mixed music and/or an audio version of the feedback (e.g., graphic feedback) may be provided via audio signaling (e.g., stereo sound) to headphones and/or speakers (e.g., stand-alone speakers or speakers integrated into another device to play an audio version of one or more instruments (for example a drum). For example, the fidget movement may be fed back and converted to an audio signal associated with the drum such that as a user fidgets, the drumming occurs with variations in frequency and/or amplitude associated with the fidget movement (e.g., fidget gesture). In certain representative embodiments, the frequency of the fidget gesture/movements may determine a playback tempo of a music composition.

In certain representative embodiments, the fidget device may enable metronome synchronization between the movement of the fidget device (e.g., a pen or wand device (such as a conductor's wand) and a music composition being played. The sensing of such a fidget movement may be based on short term linear position changes and/or via a 6 Degree Of Freedom (DOF) track.

In certain representative embodiments, a game, similar to Guitar Hero, may be implemented with a conductor capability (e.g., Conductor Hero) in which the user/gamer may attempt to match the metronome (e.g., beats of a known music composition being played) If a user can successful match the beats within a threshold, the game may continue and, if not, the game may end.

In certain representative embodiments, a game such as Orchestra Karaoke may be implemented in which a user/gamer may conduct a virtual orchestra to match a known music composition. The game may supply vocals such that the orchestra (e.g., background music) is derived based on fidget device/wand movement to generate, for example a reverse karaoke game. The reverse karaoke game may be combined with an actual karaoke system, as well.

Representative Augmented Reality (AR)/Virtual Reality (VR) Implementations

In certain representative embodiments, a virtual makeup application may be implemented. For example in this use case, a person may take a photograph and may use a makeup application and/or a custom paint program to apply makeup modifications (e.g., eye liner, blush, and/or hair highlights, etc.) using an accurate pen, cursor and/or gesture input. The virtual makeup modifications may be based on control setting that are predetermined, signaled, and/or established by the user. The virtual makeup application may be used to create custom filters that may be applied to one or more other photographs.

In certain representative embodiments, the smart pen/smart wand may be used to control an AR/VR display direction of a view. For example, display view changes may be based on which direction the pen is pointing. As one example, by rotating the tip or back end of the smart pen, the world view may be rotated accordingly. In certain representative embodiments, a scrolling/virtual scrolling unit may be used in a zoom mode to zoom-in and/or zoom-out within the display or world view. For example, a movement of the scrolling unit in one direction may enable a zoom-in operation and a movement of the scrolling unit in the opposite direction may enable a zoom-out operation. The amount of zoom may be based on the speed of the movement of the scrolling unit.

In certain representative embodiments, the scrolling unit may include one or more input sensors (e.g., capacitance or other sensors) around a periphery of the smart pen and/or smart wand to sense a rotation of a user's finger around the smart pen and/or smart wand, as a virtual scrolling unit of the smart pen and/or smart wand. In certain embodiments, haptic feedback may be implemented, for example to have the user feel feedback, as the scrolling unit is rotated/virtually rotated.

In certain representative embodiments, a switch (e.g., a push button, on the back end of the smart pen or smart wand) may be implemented to determine a zoom direction (e.g., zoom-in or zoom-out), for example via a double push (e.g., depression of the switch). In other representative embodiments, the zoom direction may be determined via a gesture, (e.g., a single tap gesture or a double tap gesture, among others). After the zoom direction is determined, the zoom-in operation or the zoom-out operation may be implemented such that a duration of depression of the switch may correspond to a zoom factor (e.g., a change (e.g., zoom) in the display view or the world view).

In certain representative embodiments, an AR highlighting and/or commenting capability/operation may be implemented to tag objects in a display view or world view and/or to provide notes and/or guidance associated with these tagged objects. In certain representative embodiments, the highlighting may include AR graffiti spray paint. A device with an IMU as the sole method of motion tracking (for example either accelerometer/gyroscope or accelerometer/gyroscope/magnetometer) may function as a 3 degrees-of-freedom (3DOF) tracker that can track the orientation of the device but may not or cannot accurately track the linear position of the device. Additional sensors (e.g., cameras, ultrasonic transducers, lasers, etc.) may be used or may be necessary for full 6 degrees-of-freedom (6DOF) tracking. In the AR context, while a 6DOF tracker may give the most natural response, a 3DOF tracker can still be used to interact with the environment by providing pointing in a direction relative to the user's location.

The AR highlighting/commenting operation may provide (e.g., leave) location-based AR notes, or highlights associated with existing objects. For example, for an AR view, the user may use the smart pen or smart wand to mark the location or locations of one or more trees to be cut down or trimmed. The user may add notes to some or all of the trees in the AR view with directions to trim or cut down particular trees. The highlighting and commenting may be done independently.

In certain representative embodiments, a twist gesture may be used to represent depth in an AR/VR view. For example, the smart pen and/or smart wand may use its pointing direction to select a direction of travel and the amount of twist of the smart pen and/or smart wand may determine a linear travel distance. In certain embodiments, a change in zoom-in/out operation may be based on the twist gesture (e.g., the amount of twist associated with a twist gesture).

In certain representative embodiments, a flick gesture may be used to represent depth in the AR/VR view. For example, the amount of force (e.g., sensed via one or more accelerometers) associated with the flick gesture may determine a depth (e.g., a depth change). In certain representative embodiments, an amplitude of the flick may be used to determine the depth (e.g., the depth change).

Figure 7:
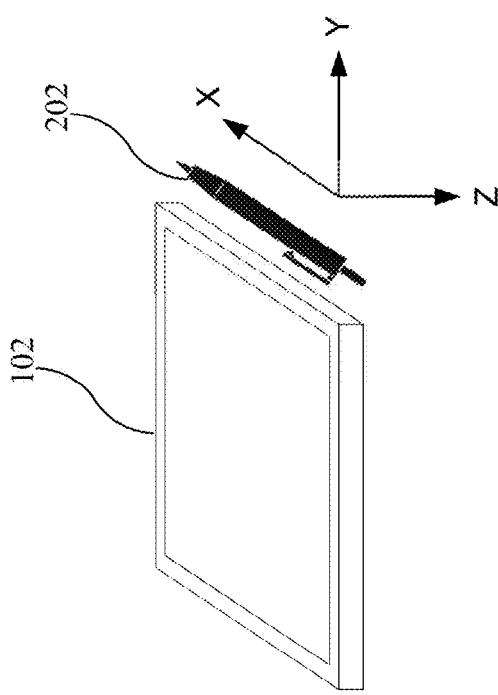
FIG. 7 is a diagram illustrating a representative procedures using orientation of a pen/input/gesture device relative to a drawing device or tablet.

Representative Procedures for Estimating the Pen/Input/Gesture Device Orientation Relative to a Tablet Orientation, for Example by Fusing the Electro Magnetic Pen Tilt with Inertial Sensors FIG. 7 is diagram illustrating an example input/gesture device 202 (e.g., an electromagnetic (EM) pen or stylus) and a consumer device 102 (e.g., a tablet device).

Referring to FIG. 7, an input/gesture device 202 (e.g., EM pen) may include a coil unit at the tip of the pen or stylist to generate EM waves. The input/gesture device 202 (e.g., EM Pen) may detect elongation of the EM waves pattern, for example which may allow detection of the yaw and pitch angle of the input/gesture device 202, where yaw and pitch may be defined in the consumer device's 102 (e.g., the tablet's) frame of reference. However, this does not allow for the detection of the roll of the input/gesture device 202, for example which may lead to unexpected behavior in drawing and other programs when the input/gesture device 202 is used for either user input or as a gesture detection mechanism. The unexpected behavior may remove the ability to support some features. For example, a calligraphy pen may have a tip that can change line thickness depending upon an orientation of the calligraphy pen. With an EM pen, the tilt of the EM pen may be sensed/measured, but the roll of the EM pen may not be sensed/measured. Drawing and other programs may choose a pen tip angle relative to a direction of tilt, and, for example not the roll of a pen. Such an approach may lead to unstable tip directions when the pen is close to perpendicular to the tablet and may prevent the artist/user from changing the tip direction without changing the tilt. With the addition of accelerometers and/or gyroscopes, a full pen orientation can be tracked. There are several options for sensors and locations, which give different levels of benefit/improvement.

Figure 8:
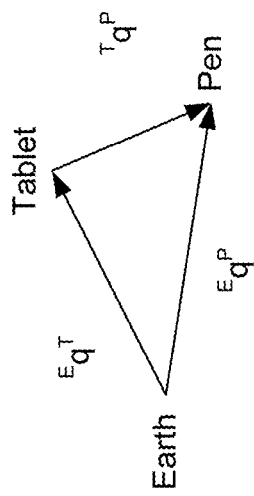
FIG. 8 is a diagram illustrating a relationship of different frames of reference (e.g., including the Earth frame of reference and the Tablet frame of reference.

FIG. 8 shows the relation of the different frames of reference. Referring to FIG. 8, the Earth frame refers to a fixed frame that is stationary relative to the tablet and pen and is level to gravity. The North direction could point to Magnetic North, True North, or in an arbitrary direction. The Tablet frame refers to the local coordinate frame of the tablet. The Pen frame refers to the local coordinate frame of the pen. The notation $^A q^B$ means the rotation of frame B relative to frame A. It is sometimes also useful to consider the position change between the two frames, and this could be notated as $^A p^B$ for the position of frame B relative to frame A. Note that the position and orientation changes can also be combined into a single 4×4 transformation matrix.

Using quaternion notation, the orientation of the pen relative to Earth frame (or an arbitrary initial reference frame), the orientation of the tablet relative to the Earth frame, and the orientation of the pen relative to the tablet are related, as shown in Equation 1:

$$^E q^P = ^E q^T \otimes ^T q^P. \quad (1)$$

where ⊗ denotes quaternion multiplication if the rotations are represented as quaternions, and matrix multiplication of the rotations are a discrete cosine matrix (DCM), a rotation matrix or transformation matrix, or the combination of the rotations if using an alternative representation (e.g. Euler angles, axis-angle etc.).

The yaw and pitch of the pen detected by the elongating of EM waves pattern are the yaw and pitch part of $^T q^P$, and the roll of the pen relative to the tablet, which is the desired information, is the remaining part of $^T q^P$ and are related, as shown in Equation 2.

$$^T q^P = ^T q_{yaw,pitch}^P \otimes ^T q_{roll}^P \quad (2)$$

Procedures for Tracking Orientation Using One-Axis Gyroscope in the Input/Gesture Device (e.g., Pen)

A single-axis gyroscope may be added to or in the pen. The single-axis gyroscope may be mounted such that it can detect the angular velocity around the +X or −X axis of the pen, if using the coordinate definitions in FIG. 7. For example, this may allow for the tracking of the roll angle of the pen when the tablet is stationary and there are not large changes in the yaw and pitch angles of the pen relative to the tablet and may not improve the tilt measurement of the pen and may not allow for tracking of the absolute roll angle relative to the tablet. The single axis gyroscope may be able to estimate the roll angle relative to an arbitrary point, and this point may drift with time, gyroscope integration errors, changes in the tablet orientation, and/or a sequence of yaw and pitch changes of the pen, etc. A practical effect is that the tip direction in the drawing program may not or will not change as the tablet is rotated, and the tip direction will not be fixed relative to a fixed point on the pen.

In certain representative embodiments, a procedure may be implemented to determine/track the orientation of the Input/Gesture Device 202 (e.g., the pen) relative to a fixed point. The procedure may include any of: (1) start with a roll angle of 0 (e.g., set to 0); (2) use a 1-axis gyroscope angle to compute the roll angle (e.g., for all time); and (3) use the yaw and pitch angle measured from the tablet.

Procedures for Tracking Orientation Using 3-Axis Gyroscope in the Input/Gesture Device (e.g., Pen)

A 3-axis gyroscope is more common and may have additional benefits over a single axis gyroscope implementation. By adding a 3-axis gyroscope, sensor fusion may enable not only tracking of the roll of the pen but also sensor fusion may improve smoothness and accuracy of yaw and pitch estimates from the EM Pen tilt.

The 3-axis gyroscopes provide angular velocity, which can be integrated to compute the angular position of the pen relative to a null reference frame $^N q^P(t)$ which starts as the null rotation $^N q^P(0)=[1,0,0,0]$. This gyroscope integration may be combined with any initial value to allow measuring in a different reference frame. For example, by using the initial orientation of the pen relative to Earth frame at time 0, $^E q^P(0)$, the gyroscope integration at time t can be used to compute the orientation of the pen relative to the Earth frame, as shown in Equation 3.

$$^E q^P(t) = ^E q^P(0) \otimes ^N q^P(t) \quad (3)$$

Based on the frame definition in FIG. 8, and using Equation 1 for both time t and time 0, Equation 4 may be derived from Equation 3 as follows:

$$^E q^T(0) \otimes ^T q^P(0) \otimes ^N q^P(t) = ^E q^T(t) \otimes ^T q^P(t) \quad (4)$$

If the tablet is stationary, that is, $^Eq^T(t)=^Eq^T(0)$, Equation 5 may be derived as follows:

$$^Tq^P(t)=^Tq^P(0)\otimes^Nq^P(t) \quad (5)$$

When the tablet is stationary, the angular position change of the pen relative to the tablet frame is given by the gyroscope integration. The implementation is equivalent to a 6-axis sensor fusion of an accelerometer and gyroscope. In that, the accelerometer may provide or may give 2 degrees of freedom by measuring the tilt relative to gravity, and the gyroscope may provide or may fill in the rest. For example, the tablet may provide or may give 2-degrees-of-freedom tilt (yaw and pitch) part of $^Tq^P$, which can be noisy, intermittent, but may be drift free; and the gyroscope integration may be accurate, smooth, but may have a slow drift. The sensor fusion may combine these two and provide a smooth and drift-free version of pen's orientation versus and/or relative to the tablet.

In certain representative embodiments, a procedure may be implemented to determine/track the orientation of the input/gesture device 202 (e.g., the pen) relative to the consumer device 102. The procedure may include any of: (1) performing sensor fusion (e.g. Kalman filter, complementary filter etc.) to combine the tilt estimates from the EM Pen Tilt and the gyroscope such that: (1) when clean and stable readings for tilt from the EM Pen are available, the yaw and pitch estimates from the Pen may converge to the EM Pen Tilt, (2) when the EM Pen tilt readings are noisy and unstable, the gyroscope may be used to track the change in tilt from the previous estimate, and/or (3) the roll angle may start from an arbitrary point, and then may track using the gyroscope integration. This approach may or may not be able to correctly track the roll angle if the tablet is not stationary.

If the pen is close enough to the tablet to sense the tilt of the pen, then most of the rotation of the tablet may be detected through the change of EM tilt. For example, the rotation of the tablet around the x-axis of the pen may not cause an EM tilt change, so this rotation may be invisible to the pen. But the other 2 out of 3 degrees of freedom of the tablet movement may be tracked, by the following representative procedure.

The x-axis of the pen in the tablet frame is given by the EM tilt, where the v⤳q operator means to rotate a vector v by the rotation q, as shown in Equation 6, as follows.

$$^Tv_1^{Px}=\hat{x}⤳^Tq_{yaw,pitch}^P \quad (6)$$

The x-axis of the pen relative the null reference frame $^Nq^P(t)$ which starts as the null rotation $^Nq^P(0)=[1,0,0,0]$ is as shown in Equation 7, as follows $$^Nv^{Px}=\hat{x}⤳^Nq^P \quad (7)$$

The x-axis of the pen in the tablet frame may normally be computed by Equation 8, as follows:

$$^Tv_2^{Px}=\hat{x}⤳(^Tq^N\otimes^Nq^P) \quad (8)$$

where $^Tq^N=(^Nq^T)^*$, where * means the conjugate, which for quaternions is the inverse.

In certain embodiments, $^Nq^T(0)$ cannot or may not be measured, as there may not be inertial sensors in the tablet, and, for example also because N is an arbitrary frame set by the starting orientation of the pen. One way to obtain $^Nq^T(0)$ is to initialize $^Tv_2^{Px}=^Tv_1^{Px}$, and solve for a $^Nq^T(0)$ that satisfies Equation (8). One possible solution to this would be $^Tq_{yaw,pitch}^P$. Future cycles may update the values from the previous estimate.

When the tablet is stable, and the gyroscope integration drift is negligible, the x-axis of the pen in the tablet frame obtained through Equation 6, $^Tv_1^{Px}$, and from Equation 8, $^Tv_2^{Px}$, should be the same. When the tablet orientation changes, these two vectors might not match. If the difference of these two vectors is caused by tablet orientation change or the combination of both tablet and pen changing orientation, the tablet orientation relative to the pen's null frame $^Nq^T$ q may be corrected from the obtained $^Tv_1^{Px}$ and $^Tv_2^{Px}$ which is the rotation Δq that rotate $^Tv_2^{Px}$ to $^Tv_1^{Px}$, as shown in Equation 9, as follows:

$$^Tv_1^{Px}=^Tv_2^{Px}⤳\Delta q. \quad (9)$$

which may allow the estimate to be updated for $^Nq^T$, as shown in Equation 10, as follows:

$$^Nq^T(t+1)=^Nq^T(t)\otimes\Delta q. \quad (10)$$

The rotation axis of Δq may be computed by first computing the cross product of the two vectors, as shown in Equation 11, as follows:

$$u=^Tv_2^{Px}\times^Tv_1^{Px} \quad (11)$$

and the rotation angle may be given, as shown in Equation 12 by:

$$\theta=\cos^{-1}(^Tv_1^{Px},^Tv_2^{Px}) \quad (12)$$

The tablet orientation change versus reference frame is finally given by converting the axis and angle to the equivalent quaternion as set forth in Equation 13, as follows:

$$\Delta q = \cos\frac{\theta}{2}+u\cdot\sin\frac{\theta}{2}. \quad (13)$$

Based on these calculations, the approach may be to (1) maintain an estimate for the orientation of the tablet relative to an arbitrary initial reference; (2) during periods of time when the EM Tilt is detected: (i) use the gyroscope to track the change in the pen x vector as set forth in Equation 8; (ii) use the EM Tilt to track the pen x vector in tablet frame as set forth in Equation 6 and (3) adjust the tablet orientation such that these estimates agree using Equation 10 and 13.

This approach may not be able to track the absolute roll angle of the pen, and this angle may drift when the tablet moves. This approach may track the changes in roll (e.g., well) during periods when the tablet is stationary, and may track some changes in tablet orientation. The motion that cannot be tracked may be a rotation around the pen's X-axis.

Procedures for Tracking Orientation Using 3-Axis Gyroscope and 3-Axis Accelerometer in the Input/Gesture Device (e.g., Pen)

By adding a three-axis accelerometer and a three-axis gyroscope, both the absolute roll angle of the pen, and the relative yaw angle of the table can be estimated and tracked. This is accomplished by tracking the linear accelerations sensed by the accelerometer during periods where the pen is close enough to the tablet to track the linear position of the pen. This may be accomplished by using an approach similar to those in U.S. patent application Ser. No. 16/012,078 entitled "Methods, Architectures, Apparatuses, Systems Directed To Device Position Tracking", the contents of which are incorporated by reference herein.

In certain representative embodiments, a procedure may be implemented to determine/track the orientation of the input/gesture device 202 (e.g., the pen) relative to the tablet. The procedure may include operations that take effect during the times when the pen is close enough to the tablet to track the linear position. The procedure may apply one or more operations set forth in U.S. patent application Ser. No.

16/012,078 to find the frame alignment between the linear position changes detected by the accelerometer in the pen and the linear position tracked on the surface of the tablet by the pen tip. The process may include any of (1) to apply the rigid body formula to estimate the acceleration of the tip of the pen, rather than the location of the accelerometer; (2) convert the p=(x, y) coordinates of the pen tip captured on the tablet from 2D to 3D by assigning z to 0, i.e. p=(x, y, 0); (3) if the size of the tablet is known, apply the appropriate scaling to convert from pixels to distance (e.g. meters); (4) apply zero or more DC-blocking filters on both the 3D pointer trajectory from the tablet and the double integrated accelerometer data; and/or (5) determine or find the best frame alignment that aligns the two signals, and for example may align the scale, which may be used and/or needed if the size of the tablet is not known.

Once the frame alignment is known between the Earth frame and the Tablet frame, ($^{E}q^T$,) then the full orientation of the pen in the tablet frame is known (by Equation 1), and the roll angle may be an absolute roll angle. If the tablet changes orientation, that change may not be detected immediately by this approach, until there is a sufficient amount of linear position change to detect the change. There may be benefit of using the representative embodiments described herein to determine 2 out of 3 degrees of freedom of the tablet movement and use this representative procedure to resolve the remaining degree of freedom to get the absolute roll angle. This absolute roll angle may be fused with the previous approach where there was only a gyroscope (and no accelerometer) in the pen. The previous approach gave a stable, but not absolute roll angle. This provides an absolute roll angle, but only when in motion, and might be noisy. Sensor fusion may balance these two estimates.

Procedures for Tracking Orientation Using 3-Axis Gyroscope and 3-Axis Accelerometer in the Input/Gesture Device (e.g., Pen), and a 3-Axis Gyroscope in a Consumer Device (e.g. Tablet)

By adding a three-axis gyroscope to the tablet, changes in orientation of the tablet may be tracked which may reduce (e.g., greatly reduce) errors introduced by movement of the tablet.

In this example, the gyroscope integration of the pen relative to an initial frame N is $^{N}q^P$, the gyroscope integration of the tablet relative to a different initial frame M is $^{M}q^T$, and the measurement of the pen tilt as measured by the EM coil is: a $^{T}q_{yaw,pitch}^{P}$. Like in a previous section, $^{T}v_1^{Px}$ may be defined as set forth in Equation 14, as follows:

$$^{T}v_1^{Px} = \hat{x} \curvearrowright {}^{T}q_{yaw,pitch}^{P} \qquad (14)$$

and $^{T}v_2^{Px}$ may be defined as set forth in Equation 15, as follows:

$$^{T}v_2^{Px} = \hat{x} \curvearrowright ({}^{T}q^M \otimes {}^{M}q^N \otimes {}^{N}q^P) \qquad (15)$$

Here $^{M}q^N$ is the rotation between the initial frame of tablet and the initial frame of pen, which is conceptually similar to the initial orientation of the tablet vs null frame in the session $^{N}q^T(0)$. One way to obtain $^{M}q^N(0)$ is to initialize $^{T}v_2^{Px} = {}^{T}v_1^{Px}$, and solve for a $^{M}q^N(0)$ that satisfies Equation (15). One possible solution to this would be $^{T}q_{yaw,pitch}^{P}$.

If both gyroscope integrations are drift-free, then $^{T}v_1^{Px}$ and $^{T}v_2^{Px}$ may remain the same. But with gyroscope integration drift and other factors, these two factors may not be or are not the same.

Another pair of vectors may be defined by using the y axis of the pen, e.g., instead of the x axis, which are referred to as $^{T}v_1^{Py}$ and $^{T}v_2^{Py}$. Table 1 illustrates how the pen's x-axis and y-axis may be derived based on EM Tilt and gyroscope integration.

TABLE 1

| | Based on EM Tilt | Based on gyroscope integration |
|---|---|---|
| Pen X axis | $^{T}v_1^{Px} = \hat{x} \curvearrowright {}^{T}q_{yaw,pitch}^{P}$ | $^{T}v_2^{Px} = \hat{x} \curvearrowright ({}^{T}q^M \otimes {}^{M}q^N \otimes {}^{N}q^P)$ |
| Pen Y axis | $^{T}v_1^{Py} = \hat{y} \curvearrowright {}^{T}q_{yaw,pitch}^{P}$ | $^{T}v_2^{Py} = \hat{y} \curvearrowright ({}^{T}q^M \otimes {}^{M}q^N \otimes {}^{N}q^P)$ |

Finding and/or determining the rotation $^{N}(\Delta q)^T$ that can match vector $^{T}v_2^{Px}$ to $^{T}v_1^{Px}$, and match $^{T}v_2^{Py}$ to $^{T}v_1^{Py}$ simultaneously is the standard Wahba problem. There are many ways to solve this problem. One procedure may be to solve for a solution by singular value decomposition. For this procedure, the vectors $^{T}v_1^{Px}$ and $^{T}v_1^{Py}$ may be the observations in one frame, and $^{T}v_2^{Px}$ and $^{T}v_2^{Py}$ may be the two observations in a second frame, and the Wahba solution may be the best rotation that aligns these measurements. In certain representative embodiments, these observations may be weighted by quality. It can also be solved by using two rotations (e.g., Rotation 1 and Rotation 2). The procedure may include (1) using Rotation 1 to fully align $^{T}v_2^{Px}$ and $^{T}v_1^{Px}$, which is $^{N}(\Delta q)_x^{T}$; (2) rotate $^{T}v_2^{Py}$ by Rotation 1 to get a new vector; (3) compute Rotation 2, as a rotation around vector $^{T}v_1^{Px}$ (also the new $^{T}v_2^{Px}$) that can minimize the distance between new $^{T}v_2^{Py}$ vector and $^{T}v_1^{Py}$ and (4) obtain the combined rotation $^{N}(\Delta q)^T$, as a multiplication of Rotation 1 and Rotation 2. After rotation, $^{N}(\Delta q)^T$ is obtained, the orientation of tablet through fitting the vector pairs $^{N}q_{Fit}^{T}$ is given by Equation 16, as follows:

$$^{N}q_{Fit}^{T} = {}^{N}q^M \otimes {}^{M}q^T \otimes {}^{N}(\Delta g)^T \qquad (16)$$

This may be a noisy, intermittent, but drift-free version. The second version of the tablet orientation may be from the gyroscope integration. $^{N}q_{Gyro}^{T}$ is given by Equation 17, as follows:

$$^{N}q_{Gyro}^{T} = {}^{N}q^M \otimes {}^{M}q^T \qquad (17)$$

This version is smooth and accurate in the short term, but may drift in the long term. Sensor fusion may balance noise in qFit with smoothness from qGyro to obtain the $^{N}q^T$.

The orientation of the pen versus the tablet may be given by Equation 18, as follows:

$$^{T}q^P = {}^{T}q^N \otimes {}^{N}q^P \qquad (18)$$

In addition to improving (e.g., greatly improving) the tracking of the tablet orientation changes when in range of the pen, this also allows the tablet orientation to be tracked during periods when the pen is out of range of the tablet. If they are out of range for an extended period of time, gyroscope drift may lead to the alignment between the devices drifting. If this happens, then the alignment may be solved when the devices come back in range.

Procedures for Tracking Orientation Using 3-Axis Gyroscope and 3-Axis Accelerometer in the Input/Gesture Device (e.g., Pen), and a 3-Axis Gyroscope and 3-Axis Accelerometer in a Consumer Device (e.g., Tablet)

Figure 9:
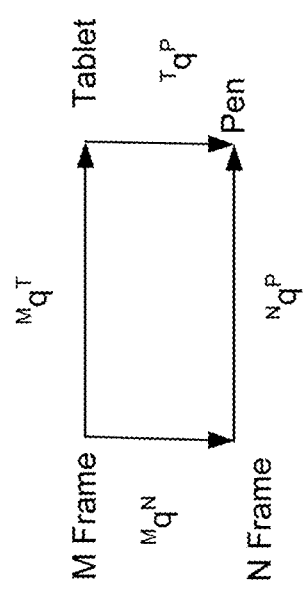
FIG. 9 is a diagram illustrating a second relationship of different frames of reference (e.g., including N and M frames).

With the presence of a 3-axis accelerometer in both the tablet and the pen, along with the EM measured pen tilt in the tablet frame, the absolute roll angle may be measured accurately even when the pen is at rest, for all cases except for when the pen's X-axis is parallel to gravity. Referring to FIG. 9, the M frame and N frame in this instance will be level frames with arbitrary "North" directions. The accelerometer and the gyroscope in the tablet may measure the orientation of the tablet relative to the level frame M, $^{M}q^T$, using 6-axis sensor fusion; The accelerometer and gyroscope in the pen may measure the orientation of the pen relative to the level frame N, $^{N}q^{T}$, using 6-axis sensor fusion; and the tablet may use the EM field to measure the yaw and pitch of the pen relative to the tablet $^{T}q_{yaw,pitch}{}^{P}$. The full rotation (including roll) between the tablet and the pen may be computed using a solution to Wahba's problem. In this formulation, there may be two observations in each frame:

TABLE 2

|  | Pen Frame | Tablet Frame |
|---|---|---|
| Earth Z-axis (gravity) | $P_g = \hat{z} \curvearrowright {}^{N}q^{P}$ | $T_g = \hat{z} \curvearrowright {}^{M}q^{T}$ |
| Pen X-axis | $P_{x_p} = \hat{x}$ | $T_{x_p} = \hat{x} \curvearrowright {}^{T}q_{yaw,pitch}{}^{P}$ |

As illustrated in Table 2, the orientation estimates based on gravity, $^{N}q^{P}$ and $^{M}q^{T}$, may alternatively be based on the accelerometer reading when the device is at rest, which would allow this approach to work with accelerometers only and no gyroscopes. The full rotation $^{T}q^{P}$, including roll is the solution to this Wahba formulation, and can be solved by any appropriate algorithm, including SVD and two rotations as detailed above.

If the X-axis of the pen is parallel to gravity for only a short period of time, that may be fine because sensor fusion may allow the gyroscope to still track the roll correctly, until the tilt of the pen changes. If the x-axis of the pen is vertical for a long period of time during writing, then the DC-blocked alignment of the linear acceleration and the pen trajectory (reference above) may be used to cover this case. In addition, the accelerometer in the tablet may be used to reduce the errors in this procedure for the cases when the pen and the tablet are both in motion.

Sensor fusion may help balance the errors between these two different estimates for absolute roll, and may correct for errors and noise in the EM pin tilt measurement.

Adding a magnetometer to both the tablet and the pen may limit the drift in the yaw axis if there is a good magnetometer calibration in both the tablet and pen. With 9-axis fusion in both the pen and tablet, the EM tilt measurement may not be used or required, and the orientation of the pen relative to the tablet may be based on the pen relative to Earth and the tablet relative to Earth. In practice, the EM measurement may still be more accurate than the magnetic North reading, and so using sensor fusion to combine them may be advantageous.

Example Embodiments

In certain representative examples, a tablet can sense the yaw and pitch of the or more gyroscopes) may be added to the pen and/or the tablet to sense the roll rotations.

For a 1-axis gyroscope in the pen, gyroscope integration may be used to provide an accurate roll angle relative to an arbitrary point when tablet is stationary, and the pen does not change pitch and yaw much.

For a 3-axis gyroscope in the pen, the procedure for estimating roll angle may be to: (1) estimate the pen's x-axis vector in the tablet frame via EM; (2) estimate the pen's x-axis vector in an arbitrary frame N via gyroscope integration; (3) find/determine Δq alignment between the tablet frame and frame N (2 out of 3 degrees of freedom for this alignment), by aligning the vectors from operations 1 and 2, and (4) minimize the change in Δq from operation 3; and/or (5) compute the roll angle of the pen relative to the tablet. In certain examples, sensor fusion may be used to improve the yaw and pitch results and combine those results with the roll estimate. The 3-axis gyroscope can handle pen motion and tablet motion and can keep a consistent relative roll angle for all motion (e.g., except for rotation of the tablet around the current X-axis of the pen).

For a 3-axis gyroscope and 3-axis accelerometer in the pen, the procedure for estimating roll angle may be to: (1) measure the 3D linear motion with the accelerometer and correlate the 3D linear motion with the 2D planar linear motion captured by the EM pen tip to solve for the frame alignment between the inertial frame and the tablet frame. In certain examples, sensor fusion may be used to improve the yaw and pitch results and combine those results with the roll estimate. The addition of a 3-axis accelerometer provides for an absolute roll angle, and not just relative roll angle. Also, a 3-axis accelerometer can enable correct for drift in roll.

For a 3-axis gyroscope and 3-axis accelerometer in the pen and 3-axis gyroscope in tablet, the procedure for estimating roll angle may be to: (1) use the gyroscope in the pen to track the pen orientation relative to an arbitrary initial frame N; (2) Use the gyroscope in the tablet to track the tablet orientation relative to an arbitrary initial frame M; (3) use the EM sensing associated with yaw and pitch to solve for ⅔ degrees of freedom for the alignment of frame N to frame M and/or use the linear acceleration frame alignment to solve for the alignment of the pen frame to the tablet frame. In certain examples, sensor fusion may be used to improve the yaw and pitch results and combine those results with the roll estimate. The addition of a 3-axis gyroscope in the tablet enables tablet motion to be tracked and may not cause as much roll drift, and/or may not require as frequently absolute roll correction.

For a 3-axis gyroscope and 3-axis accelerometer in the pen and 3-axis gyroscope and 3-axis accelerometer in tablet, the procedure for estimating roll angle may be to: (1) track the roll and pitch of the pen relative to gravity using the accelerometer of the pen; (2) track the roll and pitch of the tablet relative to gravity using the accelerometer of the tablet; (3) track the yaw and pitch of the pen relative to the tablet using the EM tilt; and (4) compute the roll angle of the pen relative to the tablet. In certain examples, sensor fusion may be used to improve the yaw and pitch results and combine those results with the roll estimate and/or combine multiple estimates for roll using multiple techniques. The addition of a 3-axis accelerometer in the tablet enables tablet motion to be tracked and may not cause as much roll drift, and/or may not require as frequently absolute roll correction. Also with the addition of a 3-axis accelerometer in the tablet, absolute roll angle can be determined even without motion for all cases (e.g., except when the pen's X-axis is close to parallel with gravity).

In certain representative embodiments, the determination (e.g., computation) of: orientations of the input/gesture device and the tablet may occur on the input/gesture device, on the tablet or in the cloud, or any combination thereof. In one example, readings from one sensor, from some sensors or from all sensors in the tablet may be sent to the input/gesture device to be processed. The processed information may be sent to the tablet to enable an improved determination of the orientation (e.g., roll, and possibly yaw and/or pitch, as well) for either or both of the input/gesture device and the tablet. In a second example, readings from one sensor, from some sensors or from all sensors in the input/gesture device may be sent to the tablet to be processed. The processed information may be sent to the input/gesture device to enable an improved determination of the orientation (e.g., roll, and possibly yaw and/or pitch, as well) for either or both of the input/gesture device and the tablet. In a third example, readings from one sensor, from some sensors or from all sensors in the input/gesture device and the tablet may be sent to another device or the cloud to be processed. The processed information may be sent to the input/gesture device and the tablet to enable an improved determination of the orientation (e.g., roll, and possibly yaw and/or pitch, as well) for either or both of the input/gesture device and the tablet.

Representative Procedures Using Input/Gesture Device for Graphics/Drawing and/or Writing Implementations Accurately tracking a pen/input/gesture device orientation relative to another device (e.g., a consumer device screen and/or tablet screen) may have uses for applications that are focused on drawing and/or writing on the screen (e.g., tablet or consumer device screen). Pen/device tilt may be used to allow for calligraphy pens and virtual paint brushes to modify an orientation and/or a size of a drawing cursor. In certain representative procedures, improved procedures may be implemented to be able to sense roll rotations. With an accurate yaw, pitch and roll estimate, a fixed relationship between rotation of the pen/input/gesture device and rotation of the cursor may be enabled, and maintained. In an example embodiment, a procedure may be to use the fixed rotation to have a calligraphy tip that keeps a constant rotation relative to how the user is holding the pen/input/gesture device, and the fixed rotation may not or does not change with the tilt of the pen/input/gesture device. In certain embodiments, only (e.g., just) the roll rotation of the cursor changes with the change in tilt.

When writing and drawing on the screen, there are attributes and properties of the text or lines being drawn that need to be set and modified. Among these are attributes such has: font type, font size, text color, brush selection, brush size, brush hardness, brush color, brush shape, and/or transparency, among others. Changing one or more of these properties may mean moving the pen/input/gesture device from the active drawing location, selecting an entry from a toolbar, menu, and/or palette, and returning to the active drawing location. It may be useful to assign these attributes to different motion contact (and/or possibly voice control gestures) that can be performed with the pen while it is still close to, or even still in contact with the active drawing location. Example gestures may include (1) motion gestures such as circle, flip, shake, and/or tap, among other. The feature associated with the gesture may change based on the mode selected. For example, a circle gesture in free space may enable a first application command/feature and a circle gesture while contacting the screen may enable a second application command/feature. In certain representative embodiments, the gestures may be combined with voice control (e.g., simple voice control), for example to confirm or override the selected motion gestures).

In certain embodiments, when the pen/input/gesture device is not close to and/or is not in contact with the tablet, the pen/input/gesture device can use the accelerometer and gyroscope to implement relative cursor control.

For a drawing and/or writing program, the user can use the cursor control to access (e.g., quickly access) different modes and/or attributes, and then may continue writing and/or drawing when or after the pen comes in contact with the drawing surface.

In various embodiments, the 3DOF orientation of the pen relative to the tablet surface (as computed above) can be used to rotate objects and change attributes of the program. One use of the 3DOF orientation may be to control the direction of lighting on the surface of the image, so that shadows and texture of the elements on a page may change on the page.

In certain representative embodiments, pen tilt relative to the screen may be estimated and used such that in a calligraphy application the pen orientation may change the nib orientation (for example realistically).

In certain representative embodiments, pen tilt relative to the screen may be estimated and used such that a world view may be controlled relative to pen orientation. For example, a change in the orientation (e.g., a rotation in the roll direction) of the pen may cause the world view to rotate and/or change a zoom level (e.g., zoom-in or zoom out).

In certain representative embodiments, pens may be used for text entry via handwriting recognition. Motion gestures may be used to change the input, for example: (1) font type; (2) font size; (3) location on the screen; (4) key commands such as enter, space, and/or backspace and/or (5) application commands such as send and/or share, among others.

In certain representative embodiments, gestures to control the painting/drawing application may allow the user to paint with motions that mimic using actual brush types. For example, a gesture may enable the haptic unit to any of: add drag haptic feedback to mimic a feel of a brush on a canvas; and/or mimic the feel of the brush picking up paint from a palette. The gesture may enable cursor control (such as paint pickup, undo, duplicate, repeat, and/or other custom actions, among others), while drawing.

In certain representative embodiments, a pen flip gesture may initiate an eraser mode in which movement of the pen across the screen may cause erasing of the corresponding portion of an image. The eraser mode may be based on a rotation of the pen around the y axis such that the tip of the pen may be facing the user. In certain representative embodiments, electronics may be positioned at both ends of the pen (for example such that either end of the pen may be individually sensed by a screen when in the vicinity or contacting the screen. In certain representative embodiments, an AES or capacitive touch-based pen may be used to determine a flip gesture.

In certain representative embodiments, a tap or flick gesture to save, share and/or erase contents on a screen may be implemented.

In certain representative embodiments, a roll pen gesture may be used to pick a color and/or a tool. For example, if a user rolls a pen (e.g., in a user's hand) to select a color or a tool. The portion of the pen facing a direction (e.g., an up direction) may correspond to the selected color/tool.

Representative Smart Home Implementations

In certain representative embodiments, a smart pen and/or smart wand may be used to point to and/or to gesture to a real world device to control the device (for example, for whole home control). For example, locations of objects in a room may be mapped to a coordinate system of the smart pen and/or smart wand such that the smart pen and/or smart wand may determine whether a pointing direction of the smart pen and/or smart wand intersect with an object in the room. If so, the smart pen and/or smart wand may determine if a gesture (for example a circle gesture or a finger tap gesture) is being performed. For example, if a circle gesture is being performed just before, while or just after pointing at an object, the smart pen and/or smart wand may communicate with another device (e.g., a central hub) to perform one or more functions (e.g., toggle on/off the object, powering on the object, powering-off the object, changing volume levels, changing lighting levels, and/or changing lighting colors, among others). Other control based gestures may include flick, flick in a particular direction, and/or shake, among others. In certain representative embodiments, the figure tap gesture may include a determination, via sensors (e.g., via a capacitance change) on the smart pen and/or smart wand that a finger of the user caused the tap. The gestures may control operations of the object such a power-on, power-off, toggle on/off, volume control, diming/sleep control, and/or particular functions associated with the pointed-to object. In certain representative embodiments, particular gestures associated with the object may be specified by the central hub via audio feedback. For example, the central hub may inform the user that a flick gesture may be performed to turn-off the object or that a circle gesture may be performed to lower the lighting level.

In certain representative embodiments, a flick gesture (e.g., flick left/right) or other gesture may be performed to cycle through options associated with the object and another gesture (e.g., flick up/down) may be performed to implement an option. In certain representative embodiments, after the smart pen and/or smart wand determines the object to be controlled, voice recognition may be used to control the object via the central hub. In certain representative embodiments, the central hub may recognize which object the user is gesturing to and may pass appropriate commands on to the object.

In certain representative embodiments, the customized gestures may be integrated with IFFFT, Zapier, or Tasker, for example using a gesture Software Development Kit (SDK).

In certain representative embodiments, the system may be used as a smart home "mood" environment and may enable (1) setting of lighting level, (2) setting of lighting color, (3) closing of blinds, (3) setting volume and/or (4) TV picture mode, for example with a single gesture, via a gesture mapping operation in which a gesture may be mapped to control one or more particular objects based on preset or control parameters.

Representative Procedures Using Input/Gesture Device for Smart Home Implementations In certain representative embodiments, a smart pen and/or smart wand may be used to point to and/or to gesture to a real world device to control the device (for example, for whole home control). For example, locations of objects in a room may be mapped to a coordinate system of the smart pen and/or smart wand such that the smart pen and/or smart wand may determine whether a pointing direction of the smart pen and/or smart wand intersect with an object in the room. If so, the smart pen and/or smart wand may determine if a gesture (for example a circle gesture or a finger tap gesture) is being performed. For example, if a circle gesture is being performed just before, while or just after pointing at an object, the smart pen and/or smart wand may communicate with another device (e.g., a central hub) to perform one or more functions (e.g., toggle on/off the object, powering on the object, powering-off the object, changing volume levels, changing lighting levels, and/or changing lighting colors, among others). Other control based gestures may include flick, flick in a particular direction, and/or shake, among others. In certain representative embodiments, the figure tap gesture may include a determination, via sensors (e.g., via a capacitance change) on the smart pen and/or smart wand that a finger of the user caused the tap. The gestures may control operations of the object such a power-on, power-off, toggle on/off, volume control, diming/sleep control, and/or particular functions associated with the pointed-to object. In certain representative embodiments, particular gestures associated with the object may be specified by the central hub via audio feedback. For example, the central hub may inform the user that a flick gesture may be performed to turn-off the object or that a circle gesture may be performed to lower the lighting level.

In certain representative embodiments, a flick gesture (e.g., flick left/right) or other gesture may be performed to cycle through options associated with the object and another gesture (e.g., flick up/down) may be performed to implement an option. In certain representative embodiments, after the smart pen and/or smart wand determines the object to be controlled, voice recognition may be used to control the object via the central hub. In certain representative embodiments, the central hub may recognize which object the user is gesturing to and may pass appropriate commands on to the object.

In certain representative embodiments, the customized gestures may be integrated with IFFFT, Zapier, or Tasker, for example using a gesture Software Development Kit (SDK).

In certain representative embodiments, the system may be used as a smart home "mood" environment and may enable (1) setting of lighting level, (2) setting of lighting color, (3) closing of blinds, (3) setting volume and/or (4) TV picture mode, for example with a single gesture, via a gesture mapping operation in which a gesture may be mapped to control one or more particular objects based on preset or control parameters.

Representative Procedures Using Input/Gesture Device for CAD Implementations

In certain representative embodiments, roll rotation (e.g., spinning the pen/input/gesture device about its longitudinal axis (e.g., x-axis of the pen) may provide for scrolling. For example, for 3D modeling, by rotating the pen/input/gesture device, a displayed object (such as a wheel) may be rotated (e.g., freely rotated) and the view of the object may be changed.

A button (e.g., switch) on the pen/input/gesture device may be used to grab or release (e.g., or toggle between grabbing and releasing) an object, for example while the object is rotating.

In certain representative embodiments, procedures may be implemented to determine whether a rotation gesture is being initiated by the user of the pen/input/gesture device. For example, the pen/input/gesture device may determine whether a movement of the center of rotation of the pen/input/gesture device is greater than a threshold to determine whether a rotation gesture has been initiated.

In certain representative embodiments, a world view may be oriented or reoriented based on or relative to the orientation of the pen/input/gesture device.

In certain representative embodiments, a twist gesture may be used to zoom-in and zoom-out of a view.

In certain representative embodiments, various pen/input/gesture device gestures may be used to remotely take photos, and/or to control the photographic mode and/or configuration (portrait mode, burst mode, lighting controls, and/or night mode, among others). For example, in one embodiment, a pen tap may initiate a photo and/or a pen double tap may initiate a burst mode. When the pen is in the frame of the camera, the camera may be used to calibrate the pen orientation and/or the pen may be used to focus the camera.

In certain representative embodiments, a gyroscope may be used with a rolling action, for example to calibrate the pen and phone camera to each other.

Representative Procedures Using Input/Gesture Device for Video Playback Implementations In certain representative embodiments, real-time video frame-by-frame control may use gestures of the pen/input/gesture device to move back and forth at a video frame level, for example to determine if a referee made the right call during the game or to edit a movie at the video frame level.

Representative Procedures Using Input/Gesture Device for Operating System (OS) Control In certain representative embodiments, OS level controls may be implemented as gestures (e.g., shake to undo, pickup to unlock screen, pickup to power-on, and/or lay down to power-off).

In certain representative embodiments, for multi-screen interactions, (1) a fishing pole motion gesture may be used to automatically copy from another screen to a user's device; and/or (2) a flick gesture may be used to share a mobile user interface with a connected TV/monitor (e.g., a flick motion may have the benefit of being similar to motions in sci-fi movies/TV of throwing images/content to a second screen).

In certain representative embodiments, for collaboration, multiple pen/input/gesture devices may be connected to a single screen, An undo or a redo command/gesture may be used in coordination with another set of gestures, such as a tap gesture, such that the number of tap gestures may determine the number of undoes (e.g., steps back). For example, each tap may be one undo step. In other embodiments, the number of steps back for each tap gesture may vary (e.g., increase as the number of taps increases).

Other Representative Procedures Using Input/Gesture Device

In certain representative embodiments, a LED or other light score may be included in the pen/input/gesture device to indicate that a gesture has occurred. For example, a red light on the pen/input/gesture device may indicate that a red color has been selected via a gesture or a green light on the pen/input/gesture device may indicate that a gesture operation has completed. In other representative embodiments, "skywriting" may be enabled with LEDs on the pen/input/gesture device. For example, by gesturing (e.g., via a tap gesture and/or a shake gesture, among others) the pen/input/gesture device may display a message of the user written from another device (e.g., the user's WTRU and/or phone). One representative embodiment to implement the "skywriting" would be to (1) use 6-axis fusion of the accel and gyroscope to compute the angular position relative to a reference frame that is level to gravity and has an arbitrary forward direction. (2) detect the average axis of rotation by taking the short-term average of the angular velocity output of the gyroscope, (3) internally render the desired text along an arc that rotates around this average angular velocity, starts at one horizon, crosses the +Z axis and ends at the other horizon, (4) Uses the Y-axis of the device to determine the 'forward' direction for the letters, (5) projects the X-axis of the device into the plane whose normal is the average angular velocity (6) lights the LEDs that correspond to the rendered pixels of the text. One end of the pen/input/gesture device may include an image projection unit to project an image or a light beam (such as to enable cursor control, be used as a pointer, to image text, to image a photograph and/or to image video, among others) on a surface, for example while having the ability to move (e.g., easily move) the pen/input/gesture device while projecting the beam/image.

The contents of each of the following references: (1) a publication entitled "Tilt sensitivity and rotation in Stylus: Do you really need it." Published at https://essential-picks.com/tilt-sensitivity-and-rotation-in-stylus/; (2) U.S. Pat. No. 7,158,118 entitled "Free Space Pointing Devices with Tilt Compensation and Improved Usability;" (3) a publication entitled "Wahba's problem" at https://en.wikipedia.orq/wiki/Wahba %27s_problem, is incorporated by reference herein.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, User Equipment, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of roll angle estimation for an input/gesture device having a 3-axis gyroscope, as a first type of motion sensor, and a 3-axis accelerometer, as a second type of motion sensor, the input/gesture device being in communication with a mobile device having a surface, the method comprising:
   measuring 3D linear motion or obtaining measurements of the 3D linear motion of the input/gesture device based on reading from the 3-axis accelerometer and the 3-axis gyroscope of the input/gesture device;
   measuring 2D planar linear motion or obtaining measurements of the 2D planar linear motion of the input/gesture device based on reading from a third type of sensor;
   correlating the 3D linear motion with the 2D planar linear motion; and
   determining the roll angle of the input/gesture device relative to the surface of the mobile device by solving for frame alignment between an inertial frame and a mobile device frame using a result of the correlating step,
   wherein the step of determining the roll angle further comprises:
   applying a rigid body formula to estimate an acceleration of the tip of input/gesture device, rather than a location of the 3-axis accelerometer;
   representing the 2D planar linear motion coordinates of the tip in 3D;
   applying a DC-blocking filter on both a 3D pointer trajectory from the surface and double integrated 3-axis accelerometer data to generate two signals; and
   determining a frame alignment that aligns the two signals.

2. The method of claim 1, wherein the input/gesture device is a pen or stylus and wherein the mobile device is a tablet.

3. The method of claim 1 further comprising:
   using the determined roll angle of the input/gesture device to modify an input from the input/gesture device to the mobile device.

4. The method of claim 1, wherein the third type of sensor is an electromagnetic (EM) sensor.

5. An input/gesture device comprising:
a sensor;
a 3-axis gyroscope;
a 3-axis accelerometer; and
a processor configured to:
measure 3D linear motion or obtaining measurements of the 3D linear motion of the input/gesture device based on reading from the 3-axis accelerometer and the 3-axis gyroscope of the input/gesture device;
measure 2D planar linear motion or obtaining measurements of the 2D planar linear motion of the input/gesture device based on reading from a third type of sensor;
correlate the 3D linear motion with the 2D planar linear motion; and
determine the roll angle of the input/gesture device relative to the surface of the mobile device by solving for frame alignment between an inertial frame and a mobile device frame using a result of the correlate step,
wherein the processor is further configured to perform the determine step by:
applying a rigid body formula to estimate an acceleration of the tip of input/gesture device, rather than a location of the 3-axis accelerometer;
representing the 2D planar linear motion coordinates of the tip in 3D;
if a size of the surface is known, applying scaling to convert from pixels to distance;
applying a DC-blocking filter on both a 3D pointer trajectory from the surface and double integrated 3-axis accelerometer data to generate two signals; and
determining a frame alignment that aligns the two signals.

6. The input/gesture device of claim 5, wherein the input/gesture device is a pen or stylus.

7. The input/gesture device of claim 5 wherein the processor is further configured to use the determined roll angle of the input/gesture device to modify an input from the input/gesture device to the mobile device.

8. The input/gesture device of claim 5, wherein the third type of sensor is an electromagnetic (EM) sensor.

* * * * *